United States Patent
Samarao

(10) Patent No.: US 10,670,547 B2
(45) Date of Patent: Jun. 2, 2020

(54) NANOSTRUCTURED NICKEL OXIDE ENVIRONMENTAL SENSOR DEVICE AND A PACKAGE FOR ENCAPSULATING THE DEVICE

(71) Applicant: Robert Bosch GmbH, Stuttgart (DE)

(72) Inventor: Ashwin Samarao, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 45 days.

(21) Appl. No.: 15/780,084

(22) PCT Filed: Nov. 30, 2016

(86) PCT No.: PCT/EP2016/079267
§ 371 (c)(1),
(2) Date: May 30, 2018

(87) PCT Pub. No.: WO2017/093311
PCT Pub. Date: Jun. 8, 2017

(65) Prior Publication Data
US 2018/0356357 A1 Dec. 13, 2018

Related U.S. Application Data

(60) Provisional application No. 62/262,572, filed on Dec. 3, 2015, provisional application No. 62/262,529, filed on Dec. 3, 2015, provisional application No. 62/261,599, filed on Dec. 1, 2015, provisional application No. 62/261,188, filed on Nov. 30, 2015, provisional application No. 62/261,193, filed on Nov. 30, 2015.

(51) Int. Cl.
*G01N 27/12* (2006.01)

(52) U.S. Cl.
CPC ......... *G01N 27/127* (2013.01); *G01N 27/128* (2013.01)

(58) Field of Classification Search
CPC .................. G01N 27/127; G01N 27/128
USPC .......................................... 324/693
See application file for complete search history.

(56) References Cited

U.S. PATENT DOCUMENTS 4,792,433 A * 12/1988 Katsura .................. G01N 27/12
324/71.5
6,196,052 B1 * 3/2001 May ...................... B01D 53/30
73/24.06
(Continued)

FOREIGN PATENT DOCUMENTS

EP 2 762 869 A1 8/2014

OTHER PUBLICATIONS

International Search Report corresponding to PCT Application No. PCT/EP2016/079267, dated Feb. 13, 2017 (3 pages).

*Primary Examiner* — Christopher P McAndrew
(74) *Attorney, Agent, or Firm* — Maginot, Moore & Beck LLP

(57) ABSTRACT

A nanostructured environmental sensor includes a silicon based substrate, a structural base located above the substrate, and a sensor portion suspended above the structural base. A top surface of the sensor portion is formed from nickel oxide using atomic layer deposition. The nanostructured thin film nickel oxide environmental sensor is provided in a housing to form an environmental sensor package for sensing attributes of the environment to which the environmental sensor package is exposed.

5 Claims, 27 Drawing Sheets

(56) References Cited

U.S. PATENT DOCUMENTS

| | | | | |
|---|---|---|---|---|
| 6,432,362 | B1* | 8/2002 | Shinar | G01N 29/022 |
| | | | | 422/82.01 |
| 7,055,377 | B2* | 6/2006 | Paul | G01G 3/13 |
| | | | | 310/344 |
| 9,086,338 | B2* | 7/2015 | Shinobu | G01N 5/02 |
| 2002/0142478 | A1* | 10/2002 | Wado | G01N 27/124 |
| | | | | 436/151 |
| 2003/0089623 | A1* | 5/2003 | Peat | G01N 27/38 |
| | | | | 205/775 |
| 2006/0096370 | A1* | 5/2006 | Isogai | G01N 27/223 |
| | | | | 73/335.04 |
| 2006/0131679 | A1* | 6/2006 | Hantschel | B82Y 10/00 |
| | | | | 257/415 |
| 2010/0245973 | A1* | 9/2010 | Wang | C23C 14/185 |
| | | | | 359/275 |
| 2011/0316522 | A1* | 12/2011 | Shinobu | G01N 5/02 |
| | | | | 324/109 |
| 2012/0042713 | A1* | 2/2012 | Kim | C23C 24/04 |
| | | | | 73/31.06 |
| 2012/0138459 | A1* | 6/2012 | Chen | G01N 27/127 |
| | | | | 204/424 |
| 2015/0160145 | A1* | 6/2015 | Feyh | G01N 27/028 |
| | | | | 73/31.06 |

* cited by examiner

NANOSTRUCTURED NICKEL OXIDE ENVIRONMENTAL SENSOR DEVICE AND A PACKAGE FOR ENCAPSULATING THE DEVICE

CROSS-REFERENCE TO RELATED APPLICATION

This application is a 35 U.S.C. § 371 National Stage Application of PCT/EP2016/079267, filed Nov. 30, 2016, which claims priority to U.S. Provisional application Ser. No. 62/261,188 filed Nov. 30, 2015, U.S. Provisional application Ser. No. 62/261,193 filed Nov. 30, 2015, U.S. Provisional application Ser. No. 62/261,599 filed Dec. 1, 2015, U.S. Provisional application Ser. No. 62/262,572 filed Dec. 3, 2015, and U.S. Provisional application Ser. No. 62/262,529 filed Dec. 3, 2015, the contents of which are incorporated herein by reference as if fully enclosed herein.

FIELD

This disclosure relates generally to sensor devices and particularly to a nanostructured nickel oxide environmental sensor and a package for encapsulating the device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to systems and methods for a nanostructured environmental sensor includes a silicon based substrate, a structural base located above the silicon based substrate, and a sensor portion suspended above the structural base, wherein a top surface of the sensor portion is formed from nickel oxide using atomic layer deposition.

According to another exemplary embodiment of the disclosure, an environmental sensor package includes a housing having a base member and a cover member defining a cavity, a nanostructured environmental sensor is disposed within the cavity, wherein nanostructured environmental sensor is attached to one of the base member and the cover member. The nanostructured environmental sensor includes a structural base and a sensor portion suspended above the structural base, wherein a surface of the sensor portion is formed from a nickel oxide using atomic layer deposition.

According to another exemplary embodiment of the disclosure, a nanostructured environmental sensor includes a silicon based substrate, a structural base located above the silicon based substrate, and a sensor portion suspended above the structural base. A top surface of the sensor portion is formed from at least one of nickel oxide, copper oxide, zinc oxide, tin oxide, or chromium oxide using atomic layer deposition.

According to another exemplary embodiment of the disclosure, an environmental sensor package includes a housing having a base member and a cover member defining a cavity, a nanostructured environmental sensor is disposed within the cavity, and a readout circuit is disposed within the cavity and the readout circuit is electrically coupled to the nanostructured environmental sensor. The nanostructured environmental sensor is attached to one of the base member and the cover member.

According to another exemplary embodiment of the disclosure, an environmental sensor package includes a housing having a base member and a cover member defining a cavity, a nanostructured environmental sensor is disposed within the cavity, and the nanostructured environmental sensor is attached to one of the base member and the cover member. The nanostructured environmental sensor further comprises a structural base and a sensor portion suspended above the structural base and a surface of the sensor portion is formed from at least one of nickel oxide, copper oxide, zinc oxide, tin oxide, or chromium oxide using atomic layer deposition.

According to another exemplary embodiment of the disclosure, an environmental sensor system comprises a structural base assembly having a top surface and a bottom surface, a first sensor portion coupled to the top surface of the structural base assembly, and a second sensor portion coupled to the bottom surface of the structure base assembly.

According to another exemplary embodiment of the disclosure, a nanolaminated sensor structure for an environmental sensor device includes a first layer formed from copper oxide or tin oxide and a second layer formed from zinc oxide or chromium oxide, wherein the second layer is grown on the first layer using atomic layer deposition.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1:
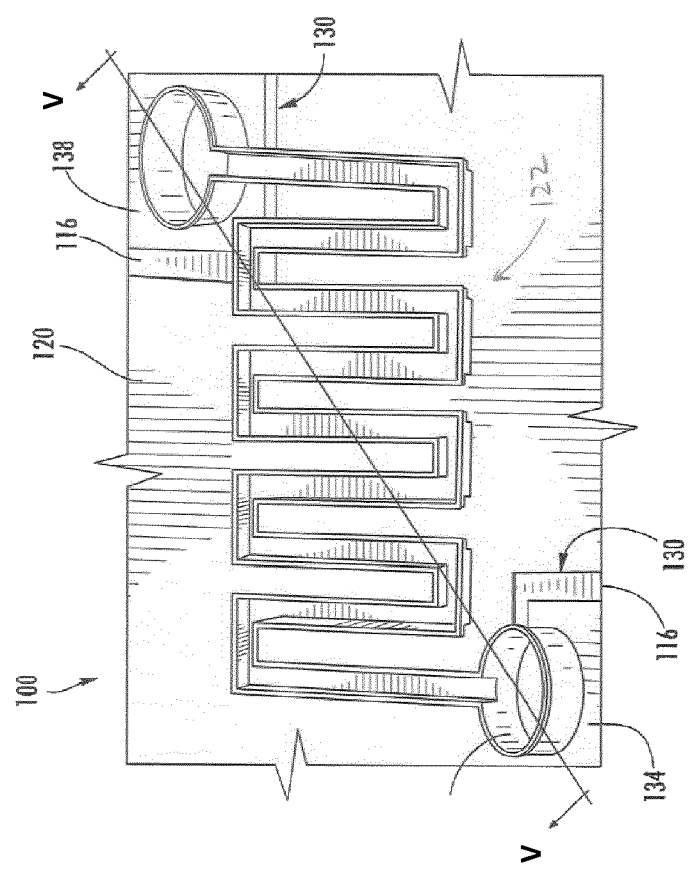
FIG. 1 is a perspective view of an exemplary nanostructured environmental sensor according to the disclosure.

As shown in FIG. 1, a semiconductor sensor assembly, which in this embodiment is at least one of a thin film or nanolaminated gas sensor device 100 configured to detect gasses such as carbon monoxide, nitrogen oxide, hydrogen sulfide, ammonia, Ethanol, liquid petroleum gas (LPG), or the like. The gas sensor device 100 (referred to as an environmental sensor) is a non-optical sensor configured to exhibit a change in resistance in the presence of at least one or more gasses including carbon monoxide, nitrogen oxide, hydrogen sufide, ammonia, Ethanol, liquid petroleum gas (LPG), or the like that is sensed by an external read out circuit to detect the presence of at least one of the carbon monoxide, nitrogen oxide, hydrogen sufide, ammonia, Ethanol, liquid petroleum gas (LPG), or the like in the environment to which the gas sensor device 100 is exposed. The gas sensor device 100 formed with a nanostructured or nanolaminated sensor layer has an extremely small form factor making it usable to detect gases in a wide variety of commercial and consumer applications such as electronic devices, HVAC systems, security systems, environmental devices, fuel cell systems, air quality monitoring systems, automobile exhaust systems, breath analysis devices, home appliances, earpieces, headsets, hearing aids, and the like. The nanostructured or nanolaminated layer may be formed from nickel oxide sensor layer, cobalt oxide sensor layer, copper oxide sensor layer, copper oxide/zinc oxide sensor layer, tin oxide/chromium oxide sensor layer, or the like. The electronic devices may be a cellular phone, a tablet, a personal computer, a laptop, a wireless device, a portable or handheld music player, a camera, a GPS receiver, a navigation system, a projector, a wearable device, a personal digital assistant (PDA), a gaming console, and the like.

The exemplary embodiment of the gas sensor device 100 as shown in FIG. 1 includes a substrate 108 (as depicted in FIGS. 2A-2E), an insulator layer 116, an electrically conductive layer 120, a suspended sensor portion 122, an opening 130, and pillars 134, 138. The substrate 108 is formed from silicon or another desired type of substrate. The insulator layer 116, in one embodiment, is a deposited dielectric such as, silicon dioxide ($SiO_2$). The insulator layer 116 is deposited over the substrate 108. In another embodiment, the insulator layer 116 is formed from any suitable electrically insulating material. The electrically conductive layer 120 is formed over the insulator layer 116. In one embodiment, the conductive layer is formed from platinum (Pt). The opening 130 in the conductive layer 120 electrically isolate at least one of the pillars 134, 138.

Figure 2A:
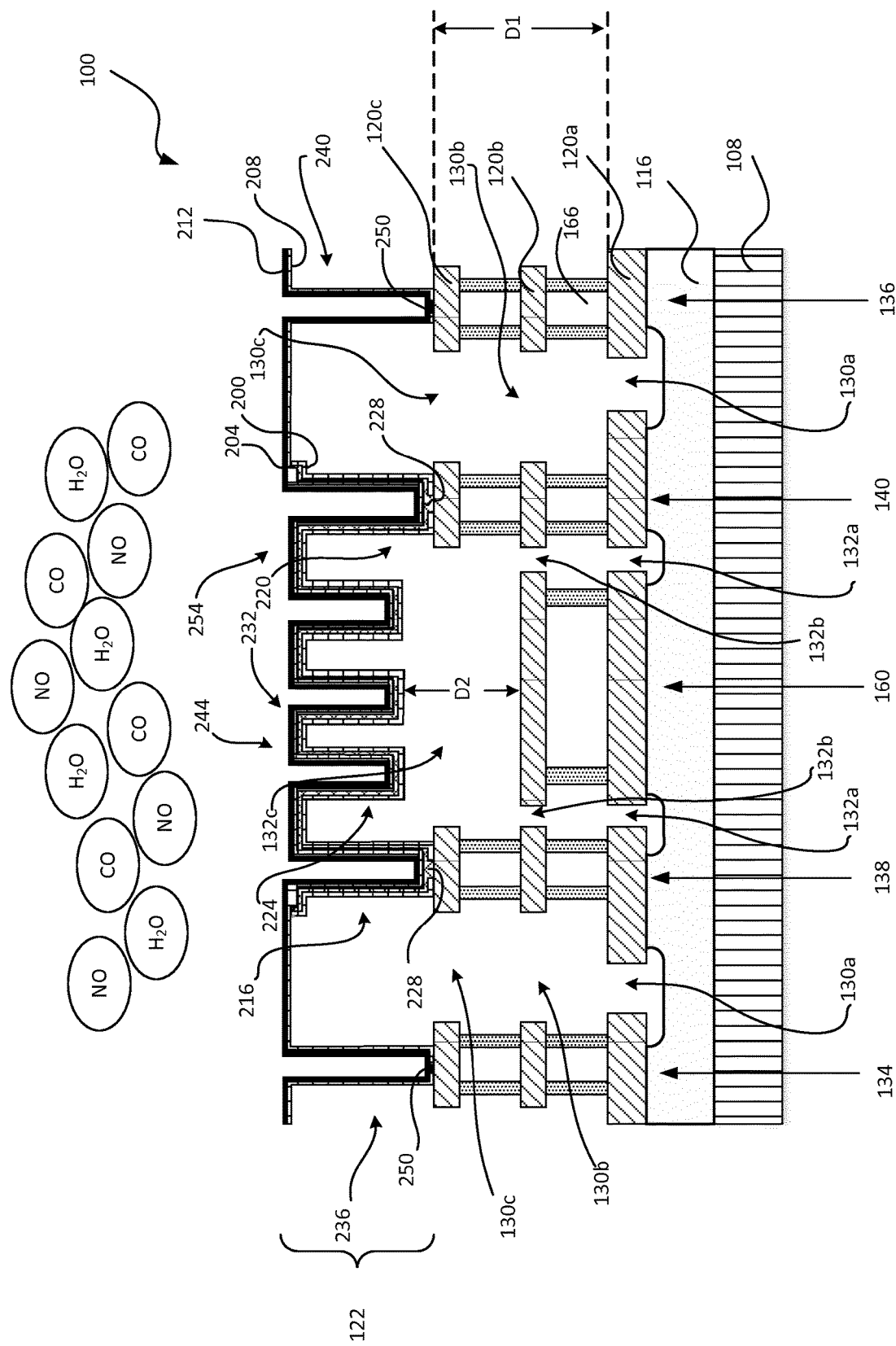
FIGS. 2A-2E are cross sectional views of the environmental sensor of FIG. 1, the view of FIGS. 2A-2E are taken along a line similar to line V-V of FIG. 1.

Now referring to FIG. 2A, a cross sectional view of the gas sensor device 100 that is substantially identical to the sensor device of FIG. 1, taken along a line similar to line V-V of FIG. 1. The gas sensor device 100 includes a substrate 108, an insulating layer 116, an electrically conductive layers, three conductive layers 120a-120c are illustrated, and a suspended sensor portion 122. The insulator layer 116, such as $SiO_2$ although any suitable electrically insulating material can be used is deposited over for example a Si-based substrate 108. Other desired type of substrate may be used depending on the application. The electrically conductive layers 120a-120c are formed over the insulator layer 106 by any deposition technique. The electrically conductive layers 120a-120c are formed from Pt. Openings 130a-130c formed in the conductive layers 120a-120c electrically isolate a left sensor pillar 134 and a right sensor pillar 136. Openings 132a-132c also formed in the conductive layers and the openings 130a-130c isolate a left heater pillar 138 and a right heater pillar 140. The pillars 134, 136, 138, and 140 each define a height that is configured to space the sensor portion 122 a first predetermined distance D1 from the conductive layer 120a and a second predetermined distance D2 from a table structure 160 locate between the heater pillars 138, 140. In some embodiments, the gas sensor device 100 does not include the table structure 160. In another embodiments, the gas sensor device 100 may include at least more than one of table structure, two pairs of sensor pillar and heat pillar, and/or extra sensor portion. In yet another embodiment, the sensor portion continuously suspended over more than two pairs of heater pillar and sensor pillar.

The pillars 134, 136, 138, and 140 are formed from any desired number of conductive layers 120 that results in the desired predetermined distances D1, D2. A respective conductive path 166 extends through each pillar 134, 136, 138, and 140 in order to electrically connect the conductive layers 120a-120c of each respective pillar. In some embodiment, the pillars 134, 136, 138, and 140 may be through vias and are filled with conductive material defines respective conductive path 166. The sensor portion 122 is formed from four thin films including an insulator layer 200, a heater layer 204, a seed layer 208, and a gas sensitive layer 212. The insulator layer 200 extends from the heater pillar 138 to the heater pillar 140 and defines a left base portion 216, a right base portion 220, and a serpentine portion 224 extended between the left and right base portions 216, 220. The base portions 216, 220 are formed on the conductive layer 120c of the heater pillars 138, 140 and are configured to mechanically support the suspended serpentine portion 224 located at the second predetermined distance D2 from and above the table structure 160. The serpentine portion 224 defines a substantially U-shaped trench in cross section that provides mechanical stability to the sensor portion 122. Other geometry or configuration in trench is possible, depending on the application. The serpentine portion 224 also increases the available surface area for detecting a target gas. In one embodiment, the insulator layer 200 is formed from any suitable electrically insulative material that is configured to be deposited into a thin film using atomic layer deposition (ALD). In yet another embodiment, the sensor portion 122 does not include the insulator layer 200.

The heater layer 204 includes two contact portions 228 and a serpentine portion 232. Similar to the insulator layer 200, the heater layer 204 also extends from the heater pillar 138 to the heater pillar 140 and define the left base portion 216 and the right base portion 220. The serpentine portion 232, similar to the serpentine portion 224 of the insulator layer 200, is also extended between the base portions 216, 220. The contact portions 228 also define as part of the base portions 216, 220 are formed either on the insulator layer 204, the conductive layer 120c, or the combination thereof and are configured to electrically connect the heater layer 204 to the heater pillars 138, 140 such that electrical energy is configured to flow from the heater pillars 138, 140 through the serpentine portion 232. The shape of the heater layer 204 corresponds to the shape of the insulator layer 200; accordingly, the serpentine portion 232 defines a substantially U-shaped trench in cross section that may provide further mechanical stability to the sensor portion 122. In one embodiment, the heater layer 204 is formed from Pt. In another embodiment, the heater layer 204 is formed from any suitable electrically conductive material that is configured to be deposited into a thin film using ALD. In the illustrated embodiment, the heater layer 204 is prevented from extending from the heater pillar 138 to the sensor pillar 134 and from the heater pillar 140 to the sensor pillar 136.

The seed layer 208 extends from the sensor pillar 134 to the sensor pillar 136 and defines a left base portion 236, a right base portion 240, and a serpentine portion 244 extended from the base portion 236 to the base portion 240. The base portions 236, 240 are formed on the conductive layer 120c of the sensor pillars 134, 136 and are configured to mechanically support the suspended serpentine portion 244 located above the table structure 160. The seed layer 208 also corresponds to the shapes of the heater layer 204 and the insulator layer 200; accordingly, the serpentine portion 244 defines a substantially U-shaped trench in cross section that may provide further mechanical stability to the sensor portion 122. In one embodiment, the seed layer 208 is formed from alumina. In another embodiment, the seed layer 208 is formed from any suitable electrically insulative material that is configured to be deposited into a thin film using ALD. Although the seed layer 208 and the insulator layer 200 are formed from the same material, such as alumina, different choice of material types may be used on both the seed layer 208 and the insulator layer 200. For example, the seed layer 208 may be formed from aluminum oxide ($Al_2O_3$) and the insulator layer 200 may be formed from alumina instead. Additionally, the selection of the seed layer 208 is based on the desired porosity of the gas-sensitive layer 212.

The gas-sensitive layer 212 (also referred to herein as a sensor layer) is a thin film that is formed on the seed layer 208 and is supported directly by the seed layer 208. The gas-sensitive layer 212 includes two contact portions 250 and a serpentine portion 254 configured to extend from the sensor pillar 134 to the sensor pillar 136. The contact portions 250 are formed on either the conductive layer 120c of the sensor pillars 134, 136, the seed layer 208, or the combination thereof and are configured to electrically connect the sensor layer 212 to the sensor pillars 134, 136, such that electrical energy is configured to flow from the sensor pillars 134, 136 through the serpentine portion 254. The seed layer 208 is configured to electrically isolate the sensor layer 212 from the heater layer 204. Accordingly, electrically energy is prevented from flowing to the sensor layer 212 from the heater pillars 138, 140. The shape of the sensor layer 212 corresponds to the shape of the seed layer 208; accordingly, the serpentine portion 254 defines a substantially U-shaped trench in cross section that may provide further mechanical stability to the sensor portion 122. In the illustrated embodiment, the sensor layer 212 is formed from nickel oxide, which as described herein is nanostructured to be sensitive to nickel oxide and nitrogen oxide. In other embodiments, the sensor layer 212 is formed from any suitable material that is sensitive to a target gas or gasses that is configured to be deposited into a thin film using ALD. As the nanostructured ALD nickel oxide sensor layer 212 absorbs the target gas or gasses, the absorption changes one or more properties that can be measured electrically, such as a change in conductivity. Thus, the nanostructured ALD nickel oxide sensor layer 212 is sometime referred as a control gate. Besides being sensitive to a target gas, the sensor layer 212 may also be configured as a heater in some embodiments of the gas sensor device 100 that do not include a heater layer 204.

Figure 2B:
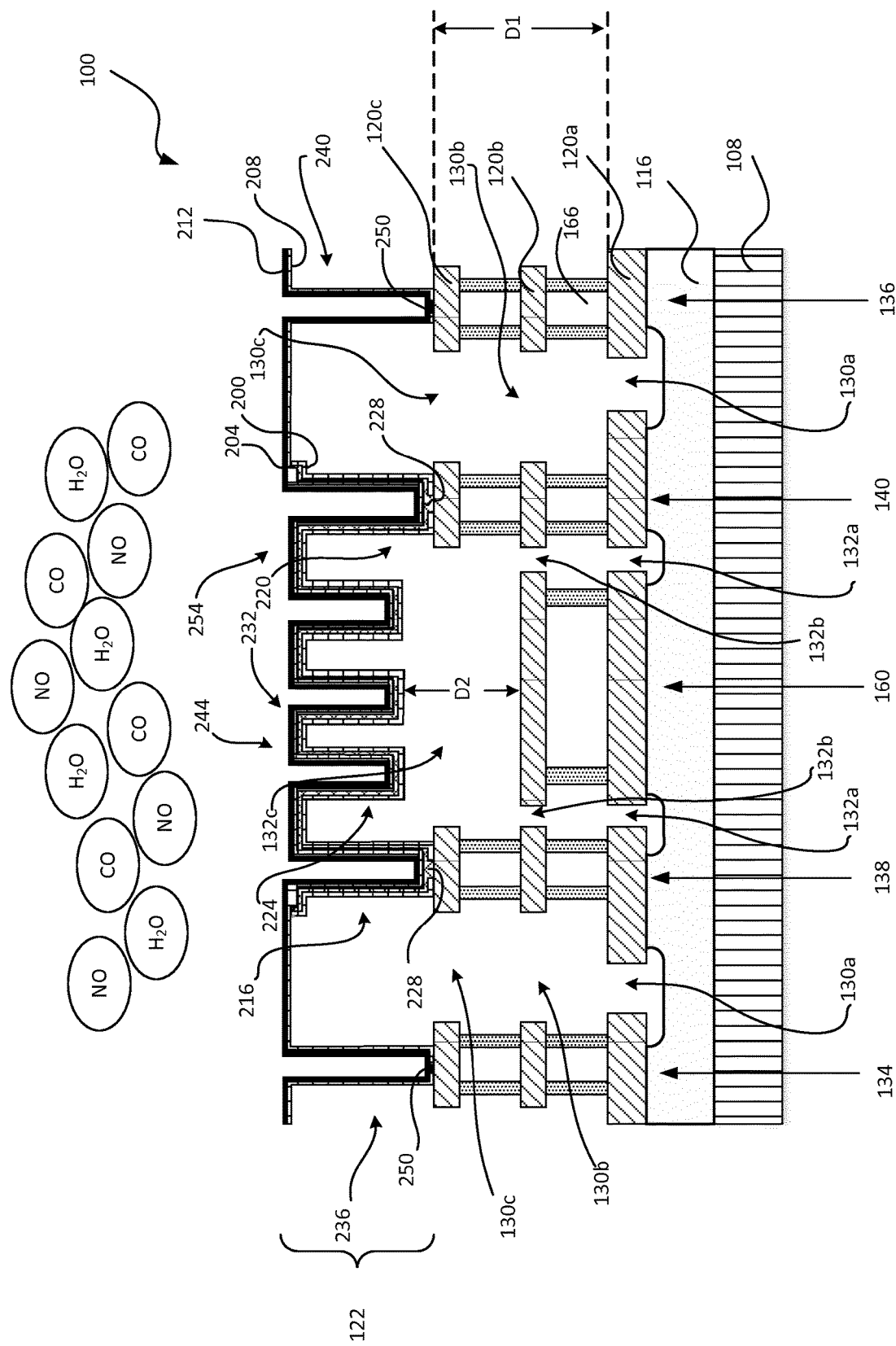

Now referring to FIG. 2B, a cross sectional view of the gas sensor device 100 that is substantially identical to the sensor device of FIG. 1, taken along a line similar to line V-V of FIG. 1. The gas sensor device 100 includes a substrate 108, an insulating layer 116, an electrically conductive layers, three conductive layers 120a-120c are illustrated, and a suspended sensor portion 122. The insulator layer 116, such as $SiO_2$ although any suitable electrically insulating material can be used is deposited over for example a Si-based substrate 108. Other desired type of substrate may be used depending on the application. The electrically conductive layers 120a-120c are formed over the insulator layer 106 by any deposition technique. The electrically conductive layers 120a-120c are formed from Pt. Openings 130a-130c formed in the conductive layers 120a-120c electrically isolate a left sensor pillar 134 and a right sensor pillar 136. Openings 132a-132c also formed in the conductive layers and the openings 130a-130c isolate a left heater pillar 138 and a right heater pillar 140. The pillars 134, 136, 138, and 140 each define a height that is configured to space the sensor portion 122 a first predetermined distance D1 from the conductive layer 120a and a second predetermined distance D2 from a table structure 160 locate between the heater pillars 138, 140. In some embodiments, the gas sensor device 100 does not include the table structure 160. In another embodiments, the gas sensor device 100 may include at least more than one of table structure, two pairs of sensor pillar and heat pillar, and/or extra sensor portion. In yet another embodiment, the sensor portion continuously suspended over more than two pairs of heater pillar and sensor pillar.

The pillars 134, 136, 138, and 140 are formed from any desired number of conductive layers 120 that results in the desired predetermined distances D1, D2. A respective conductive path 166 extends through each pillar 134, 136, 138, and 140 in order to electrically connect the conductive layers 120a-120c of each respective pillar. In some embodiment, the pillars 134, 136, 138, and 140 may be through vias and are filled with conductive material defines respective conductive path 166. The sensor portion 122 is formed from four thin films including an insulator layer 200, a heater layer 204, a seed layer 208, and a gas sensitive layer 212. The insulator layer 200 extends from the heater pillar 138 to the heater pillar 140 and defines a left base portion 216, a right base portion 220, and a serpentine portion 224 extended between the left and right base portions 216, 220. The base portions 216, 220 are formed on the conductive layer 120c of the heater pillars 138, 140 and are configured to mechanically support the suspended serpentine portion 224 located at the second predetermined distance D2 from and above the table structure 160. The serpentine portion 224 defines a substantially U-shaped trench in cross section that provides mechanical stability to the sensor portion 122. Other geometry or configuration in trench is possible, depending on the application. The serpentine portion 224 also increases the available surface area for detecting a target gas. In one embodiment, the insulator layer 200 is formed from any suitable electrically insulative material that is configured to be deposited into a thin film using atomic layer deposition (ALD). In yet another embodiment, the sensor portion 122 does not include the insulator layer 200.

The heater layer 204 includes two contact portions 228 and a serpentine portion 232. Similar to the insulator layer 200, the heater layer 204 also extends from the heater pillar 138 to the heater pillar 140 and define the left base portion 216 and the right base portion 220. The serpentine portion 232, similar to the serpentine portion 224 of the insulator layer 200, is also extended between the base portions 216, 220. The contact portions 228 also define as part of the base portions 216, 220 are formed either on the insulator layer 204, the conductive layer 120c, or the combination thereof and are configured to electrically connect the heater layer 204 to the heater pillars 138, 140 such that electrical energy is configured to flow from the heater pillars 138, 140 through the serpentine portion 232. The shape of the heater layer 204 corresponds to the shape of the insulator layer 200; accordingly, the serpentine portion 232 defines a substantially U-shaped trench in cross section that may provide further mechanical stability to the sensor portion 122. In one embodiment, the heater layer 204 is formed from Pt. In another embodiment, the heater layer 204 is formed from any suitable electrically conductive material that is configured to be deposited into a thin film using ALD. In the illustrated embodiment, the heater layer 204 is prevented from extending from the heater pillar 138 to the sensor pillar 134 and from the heater pillar 140 to the sensor pillar 136.

The seed layer 208 extends from the sensor pillar 134 to the sensor pillar 136 and defines a left base portion 236, a right base portion 240, and a serpentine portion 244 extended from the base portion 236 to the base portion 240. The base portions 236, 240 are formed on the conductive layer 120c of the sensor pillars 134, 136 and are configured to mechanically support the suspended serpentine portion 244 located above the table structure 160. The seed layer 208 also corresponds to the shapes of the heater layer 204 and the insulator layer 200; accordingly, the serpentine portion 244 defines a substantially U-shaped trench in cross section that may provide further mechanical stability to the sensor portion 122. In one embodiment, the seed layer 208 is formed from alumina. In another embodiment, the seed layer 208 is formed from any suitable electrically insulative material that is configured to be deposited into a thin film using ALD. Although the seed layer 208 and the insulator layer 200 are formed from the same material, such as alumina, different choice of material types may be used on both the seed layer 208 and the insulator layer 200. For example, the seed layer 208 may be formed from aluminum oxide ($Al_2O_3$) and the insulator layer 200 may be formed from alumina instead. Additionally, the selection of the seed layer 208 is based on the desired porosity of the gas-sensitive layer 212.

The gas-sensitive layer 212 (also referred to herein as a sensor layer) is a thin film that is formed on the seed layer 208 and is supported directly by the seed layer 208. The gas-sensitive layer 212 includes two contact portions 250 and a serpentine portion 254 configured to extend from the sensor pillar 134 to the sensor pillar 136. The contact portions 250 are formed on either the conductive layer 120c of the sensor pillars 134, 136, the seed layer 208, or the combination thereof and are configured to electrically connect the sensor layer 212 to the sensor pillars 134, 136, such that electrical energy is configured to flow from the sensor pillars 134, 136 through the serpentine portion 254. The seed layer 208 is configured to electrically isolate the sensor layer 212 from the heater layer 204. Accordingly, electrically energy is prevented from flowing to the sensor layer 212 from the heater pillars 138, 140. The shape of the sensor layer 212 corresponds to the shape of the seed layer 208; accordingly, the serpentine portion 254 defines a substantially U-shaped trench in cross section that may provide further mechanical stability to the sensor portion 122. In the illustrated embodiment, the sensor layer 212 is formed from cobalt oxide, which as described herein is nanostructured to be sensitive to cobalt oxide and nitrogen oxide. In other embodiments, the sensor layer 212 is formed from any suitable material that is sensitive to a target gas or gasses that is configured to be deposited into a thin film using ALD. As the nanostructured ALD cobalt oxide sensor layer 212 absorbs the target gas or gasses, the absorption changes one or more properties that can be measured electrically, such as a change in conductivity. Thus, the nanostructured ALD cobalt oxide sensor layer 212 is sometime referred as a control gate. Besides being sensitive to a target gas, the sensor layer 212 may also be configured as a heater in some embodiments of the gas sensor device 100 that do not include a heater layer 204.

Figure 2C:
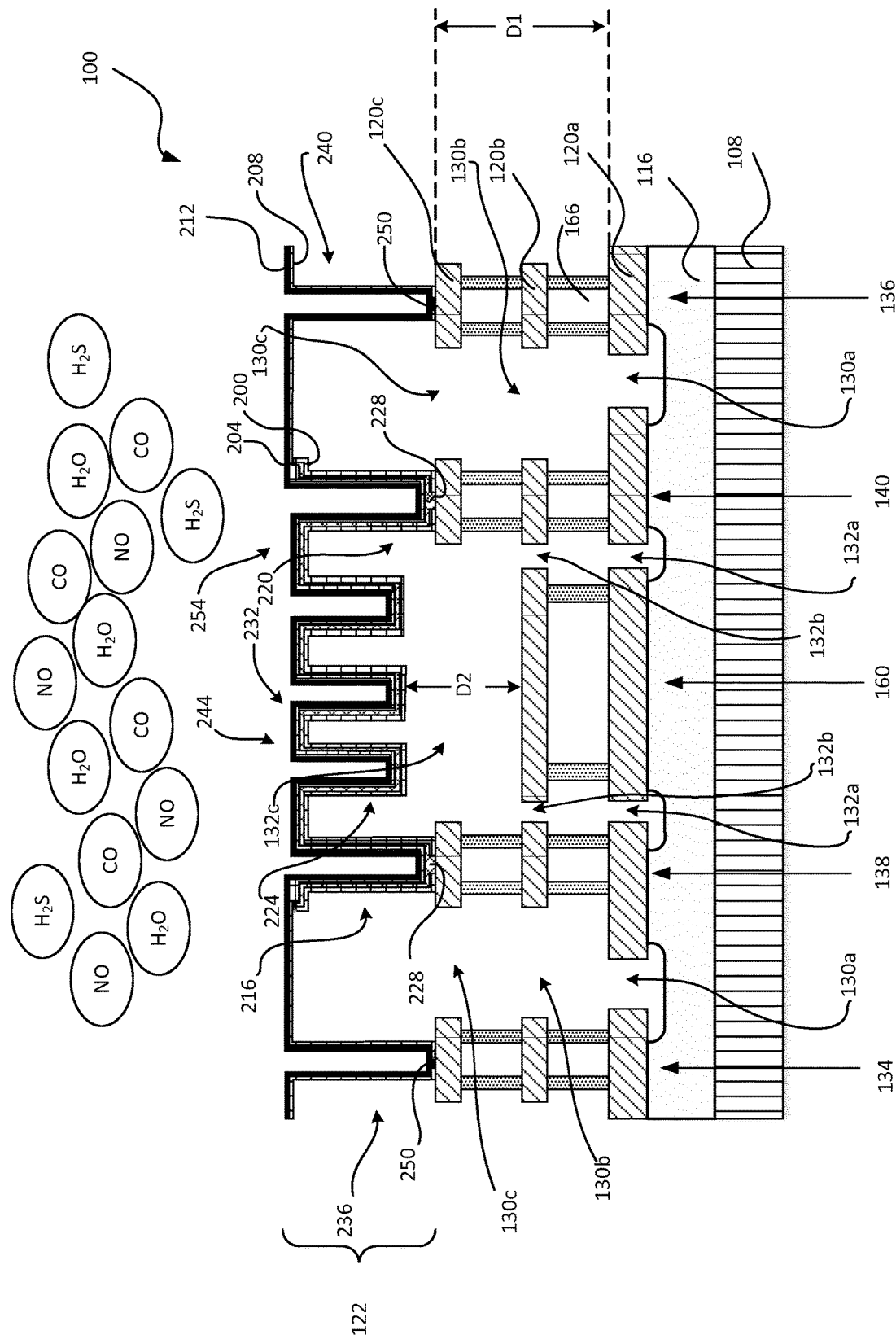

Now referring to FIG. 2C, a cross sectional view of the gas sensor device 100 that is substantially identical to the sensor device of FIG. 1, taken along a line similar to line V-V of FIG. 1. The gas sensor device 100 includes a substrate 108, an insulating layer 116, an electrically conductive layers, three conductive layers 120a-120c are illustrated, and a suspended sensor portion 122. The insulator layer 116, such as $SiO_2$ although any suitable electrically insulating material can be used is deposited over for example a Si-based substrate 108. Other desired type of substrate may be used depending on the application. The electrically conductive layers 120a-120c are formed over the insulator layer 106 by any deposition technique. The electrically conductive layers 120a-120c are formed from Pt. Openings 130a-130c formed in the conductive layers 120a-

120c electrically isolate a left sensor pillar 134 and a right sensor pillar 136. Openings 132a-132c also formed in the conductive layers and the openings 130a-130c isolate a left heater pillar 138 and a right heater pillar 140. The pillars 134, 136, 138, and 140 each define a height that is configured to space the sensor portion 122 a first predetermined distance D1 from the conductive layer 120a and a second predetermined distance D2 from a table structure 160 locate between the heater pillars 138, 140. In some embodiments, the gas sensor device 100 does not include the table structure 160. In another embodiments, the gas sensor device 100 may include at least more than one of table structure, two pairs of sensor pillar and heat pillar, and/or extra sensor portion. In yet another embodiment, the sensor portion continuously suspended over more than two pairs of heater pillar and sensor pillar.

The pillars 134, 136, 138, and 140 are formed from any desired number of conductive layers 120 that results in the desired predetermined distances D1, D2. A respective conductive path 166 extends through each pillar 134, 136, 138, and 140 in order to electrically connect the conductive layers 120a-120c of each respective pillar. In some embodiment, the pillars 134, 136, 138, and 140 may be through vias and are filled with conductive material defines respective conductive path 166. The sensor portion 122 is formed from four thin films including an insulator layer 200, a heater layer 204, a seed layer 208, and a gas sensitive layer 212. The insulator layer 200 extends from the heater pillar 138 to the heater pillar 140 and defines a left base portion 216, a right base portion 220, and a serpentine portion 224 extended between the left and right base portions 216, 220. The base portions 216, 220 are formed on the conductive layer 120c of the heater pillars 138, 140 and are configured to mechanically support the suspended serpentine portion 224 located at the second predetermined distance D2 from and above the table structure 160. The serpentine portion 224 defines a substantially U-shaped trench in cross section that provides mechanical stability to the sensor portion 122. Other geometry or configuration in trench is possible, depending on the application. The serpentine portion 224 also increases the available surface area for detecting a target gas. In one embodiment, the insulator layer 200 is formed from any suitable electrically insulative material that is configured to be deposited into a thin film using atomic layer deposition (ALD). In yet another embodiment, the sensor portion 122 does not include the insulator layer 200.

The heater layer 204 includes two contact portions 228 and a serpentine portion 232. Similar to the insulator layer 200, the heater layer 204 also extends from the heater pillar 138 to the heater pillar 140 and define the left base portion 216 and the right base portion 220. The serpentine portion 232, similar to the serpentine portion 224 of the insulator layer 200, is also extended between the base portions 216, 220. The contact portions 228 also define as part of the base portions 216, 220 are formed either on the insulator layer 204, the conductive layer 120c, or the combination thereof and are configured to electrically connect the heater layer 204 to the heater pillars 138, 140 such that electrical energy is configured to flow from the heater pillars 138, 140 through the serpentine portion 232. The shape of the heater layer 204 corresponds to the shape of the insulator layer 200; accordingly, the serpentine portion 232 defines a substantially U-shaped trench in cross section that may provide further mechanical stability to the sensor portion 122. In one embodiment, the heater layer 204 is formed from Pt. In another embodiment, the heater layer 204 is formed from any suitable electrically conductive material that is configured to be deposited into a thin film using ALD. In the illustrated embodiment, the heater layer 204 is prevented from extending from the heater pillar 138 to the sensor pillar 134 and from the heater pillar 140 to the sensor pillar 136.

The seed layer 208 extends from the sensor pillar 134 to the sensor pillar 136 and defines a left base portion 236, a right base portion 240, and a serpentine portion 244 extended from the base portion 236 to the base portion 240. The base portions 236, 240 are formed on the conductive layer 120c of the sensor pillars 134, 136 and are configured to mechanically support the suspended serpentine portion 244 located above the table structure 160. The seed layer 208 also corresponds to the shapes of the heater layer 204 and the insulator layer 200; accordingly, the serpentine portion 244 defines a substantially U-shaped trench in cross section that may provide further mechanical stability to the sensor portion 122. In one embodiment, the seed layer 208 is formed from alumina. In another embodiment, the seed layer 208 is formed from any suitable electrically insulative material that is configured to be deposited into a thin film using ALD. Although the seed layer 208 and the insulator layer 200 are formed from the same material, such as alumina, different choice of material types may be used on both the seed layer 208 and the insulator layer 200. For example, the seed layer 208 may be formed from aluminum oxide ($Al_2O_3$) and the insulator layer 200 may be formed from alumina instead. Additionally, the selection of the seed layer 208 is based on the desired porosity of the gas-sensitive layer 212.

The gas-sensitive layer 212 (also referred to herein as a sensor layer) is a thin film that is formed on the seed layer 208 and is supported directly by the seed layer 208. The gas-sensitive layer 212 includes two contact portions 250 and a serpentine portion 254 configured to extend from the sensor pillar 134 to the sensor pillar 136. The contact portions 250 are formed on either the conductive layer 120c of the sensor pillars 134, 136, the seed layer 208, or the combination thereof and are configured to electrically connect the sensor layer 212 to the sensor pillars 134, 136, such that electrical energy is configured to flow from the sensor pillars 134, 136 through the serpentine portion 254. The seed layer 208 is configured to electrically isolate the sensor layer 212 from the heater layer 204. Accordingly, electrically energy is prevented from flowing to the sensor layer 212 from the heater pillars 138, 140. The shape of the sensor layer 212 corresponds to the shape of the seed layer 208; accordingly, the serpentine portion 254 defines a substantially U-shaped trench in cross section that may provide further mechanical stability to the sensor portion 122. In the illustrated embodiment, the sensor layer 212 is formed from copper oxide, which as described herein is nanostructured to be sensitive to carbon monoxide, nitrogen oxide, and hydrogen sulfide. In other embodiments, the sensor layer 212 is formed from any suitable material that is sensitive to a target gas or gasses that is configured to be deposited into a thin film using ALD. As the nanostructured ALD copper oxide sensor layer 212 absorbs the target gas or gasses, the absorption changes one or more properties that can be measured electrically, such as a change in conductivity. Thus, the nanostructured ALD copper oxide sensor layer 212 is sometime referred as a control gate. Besides being sensitive to a target gas, the sensor layer 212 may also be configured as a heater in some embodiments of the gas sensor device 100 that do not include a heater layer 204.

Figure 2D:
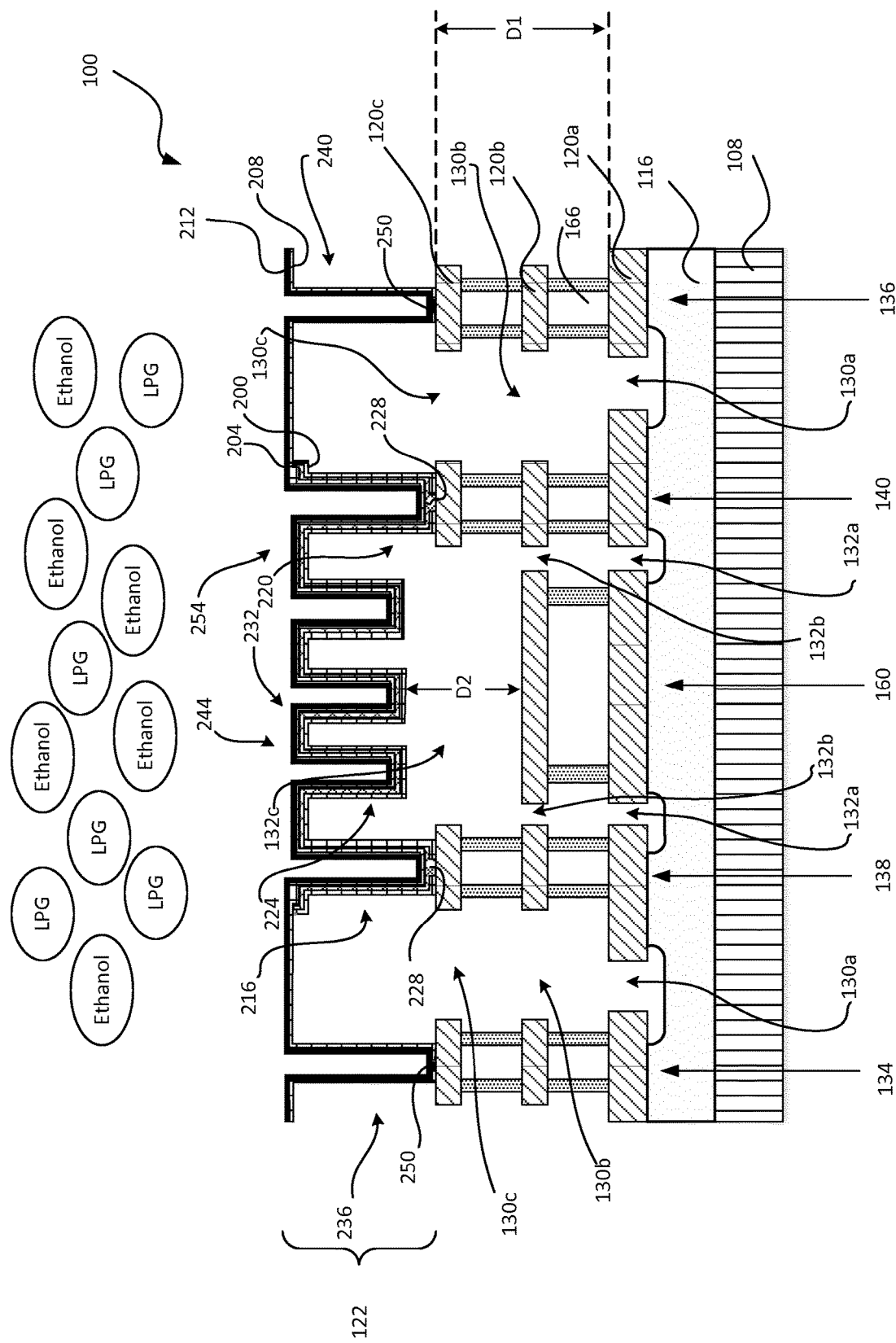

Now referring to FIG. 2D, a cross sectional view of the gas sensor device 100 that is substantially identical to the sensor device of FIG. 1, taken along a line similar to line V-V of FIG. 1. The gas sensor device 100 includes a substrate 108, an insulating layer 116, an electrically conductive layers, three conductive layers 120a-120c are illustrated, and a nanolaminated sensor portion 122 suspended above the conductive layers 120a-120c. The insulator layer 116, such as $SiO_2$ although any suitable electrically insulating material can be used is deposited over for example a Si-based substrate 108. Other desired type of substrate may be used depending on the application. The electrically conductive layers 120a-120c are formed over the insulator layer 106 by any deposition technique. The electrically conductive layers 120a-120c are formed from Pt. Openings 130a-130c formed in the conductive layers 120a-120c electrically isolate a left sensor pillar 134 and a right sensor pillar 136. Openings 132a-132c also formed in the conductive layers and the openings 130a-130c isolate a left heater pillar 138 and a right heater pillar 140. The pillars 134, 136, 138, and 140 each define a height that is configured to space the nanolaminated sensor portion 122 a first predetermined distance D1 from the conductive layer 120a and a second predetermined distance D2 from a table structure 160 locate between the heater pillars 138, 140. In some embodiments, the gas sensor device 100 does not include the table structure 160. In another embodiments, the gas sensor device 100 may include at least more than one of table structure, two pairs of sensor pillar and heat pillar, and/or extra sensor portion. In yet another embodiment, the sensor portion continuously suspended over more than two pairs of heater pillar and sensor pillar.

The pillars 134, 136, 138, and 140 are formed from any desired number of conductive layers 120 that results in the desired predetermined distances D1, D2. A respective conductive path 166 extends through each pillar 134, 136, 138, and 140 in order to electrically connect the conductive layers 120a-120c of each respective pillar. In some embodiment, the pillars 134, 136, 138, and 140 may be through vias and are filled with conductive material defines respective conductive path 166. The nanolaminated sensor portion 122 includes an insulator layer 200, a heater layer 204, a seed layer 208, and a gas sensitive structure 212. The insulator layer 200 extends from the heater pillar 138 to the heater pillar 140 and defines a left base portion 216, a right base portion 220, and a serpentine portion 224 extended between the left and right base portions 216, 220. The base portions 216, 220 are formed on the conductive layer 120c of the heater pillars 138, 140 and are configured to mechanically support the suspended serpentine portion 224 located at the second predetermined distance D2 from and above the table structure 160. The serpentine portion 224 defines a substantially U-shaped trench in cross section that provides mechanical stability to the nanolaminated sensor portion 122. Other geometry or configuration in trench is possible, depending on the application. The serpentine portion 224 also increases the available surface area for detecting a target gas. In one embodiment, the insulator layer 200 is formed from any suitable electrically insulative material that is configured to be deposited into a thin film using atomic layer deposition (ALD). In yet another embodiment, the nanolaminated sensor portion 122 does not include the insulator layer 200.

The heater layer 204 includes two contact portions 228 and a serpentine portion 232. Similar to the insulator layer 200, the heater layer 204 also extends from the heater pillar 138 to the heater pillar 140 and define the left base portion 216 and the right base portion 220. The serpentine portion 232, similar to the serpentine portion 224 of the insulator layer 200, is also extended between the base portions 216, 220. The contact portions 228 also define as part of the base portions 216, 220 are formed either on the insulator layer 204, the conductive layer 120c, or the combination thereof and are configured to electrically connect the heater layer 204 to the heater pillars 138, 140 such that electrical energy is configured to flow from the heater pillars 138, 140 through the serpentine portion 232. The shape of the heater layer 204 corresponds to the shape of the insulator layer 200; accordingly, the serpentine portion 232 defines a substantially U-shaped trench in cross section that may provide further mechanical stability to the nanolaminated sensor portion 122. In one embodiment, the heater layer 204 is formed from Pt. In another embodiment, the heater layer 204 is formed from any suitable electrically conductive material that is configured to be deposited into a thin film using ALD. In the illustrated embodiment, the heater layer 204 is prevented from extending from the heater pillar 138 to the sensor pillar 134 and from the heater pillar 140 to the sensor pillar 136.

The seed layer 208 extends from the sensor pillar 134 to the sensor pillar 136 and defines a left base portion 236, a right base portion 240, and a serpentine portion 244 extended from the base portion 236 to the base portion 240. The base portions 236, 240 are formed on the conductive layer 120c of the sensor pillars 134, 136 and are configured to mechanically support the suspended serpentine portion 244 located above the table structure 160. The seed layer 208 also corresponds to the shapes of the heater layer 204 and the insulator layer 200; accordingly, the serpentine portion 244 defines a substantially U-shaped trench in cross section that may provide further mechanical stability to the nanolaminated sensor portion 122. In one embodiment, the seed layer 208 is formed from alumina. In another embodiment, the seed layer 208 is formed from any suitable electrically insulative material that is configured to be deposited into a thin film using ALD. Although the seed layer 208 and the insulator layer 200 are formed from the same material, such as alumina, different choice of material types may be used on both the seed layer 208 and the insulator layer 200. For example, the seed layer 208 may be formed from aluminum oxide ($Al_2O_3$) and the insulator layer 200 may be formed from alumina instead. Additionally, the selection of the seed layer 208 is based on the desired porosity of the gas-sensitive layer 212. In some embodiments, the stacked insulating/heater/seed layers 200, 204, 208 is referred as first nanolaminate structure. The first nanolaminate structure includes alternating thin film layers of alumina/platinum/alumina 200, 204, 208 using ALD. Furthermore, in other embodiments, the first nanolaminate structure is formed from any desired material or materials that are configured to sense attributes such as ammonia in the environment.

The gas-sensitive structure 212 (also referred to herein as a nanolaminated sensor structure) includes multilayer thin films that is formed on the seed layer 208 and is supported directly by the seed layer 208. The gas-sensitive structure 212 includes two contact portions 250 and a serpentine portion 254 configured to extend from the sensor pillar 134 to the sensor pillar 136. The contact portions 250 are formed on either the conductive layer 120c of the sensor pillars 134, 136, the seed layer 208, or the combination thereof and are configured to electrically connect the nanolaminated sensor structure 212 to the sensor pillars 134, 136, such that electrical energy is configured to flow from the sensor pillars 134, 136 through the serpentine portion 254. The seed layer 208 is configured to electrically isolate the sensor layer 212 from the heater layer 204. Accordingly, electrically energy is prevented from flowing to the nanolaminated sensor structure 212 from the heater pillars 138, 140. The shape of the nanolaminated sensor structure 212 corresponds to the shape of the seed layer 208; accordingly, the serpentine portion 254 defines a substantially U-shaped trench in cross section that may provide further mechanical stability to the nanolaminated sensor portion 122. In the illustrated embodiment, the nanolaminated sensor structure 212 is formed from stacked or alternated layers of binary oxides such as copper oxide/zinc oxide using ALD that is sensitive to ammonia. In other embodiments, the nanolaminated sensor structure 212 is formed from any suitable material or materials that is sensitive to a target gas or gasses that is configured to be deposited into a laminate structure using ALD. As the nanolaminated sensor structure 212 absorbs the target gas or gasses, the absorption changes one or more properties that can be measured electrically, such as a change in conductivity. Thus, the nanolaminated sensor structure 212 is sometime referred as a control gate. Besides being sensitive to a target gas, the nanolaminated sensor structure 212 may also be configured as a heater in some embodiments of the gas sensor device 100 that do not include a heater layer 204. Details of the nanolaminated sensor structure 212 will be described below.

Figure 2E:
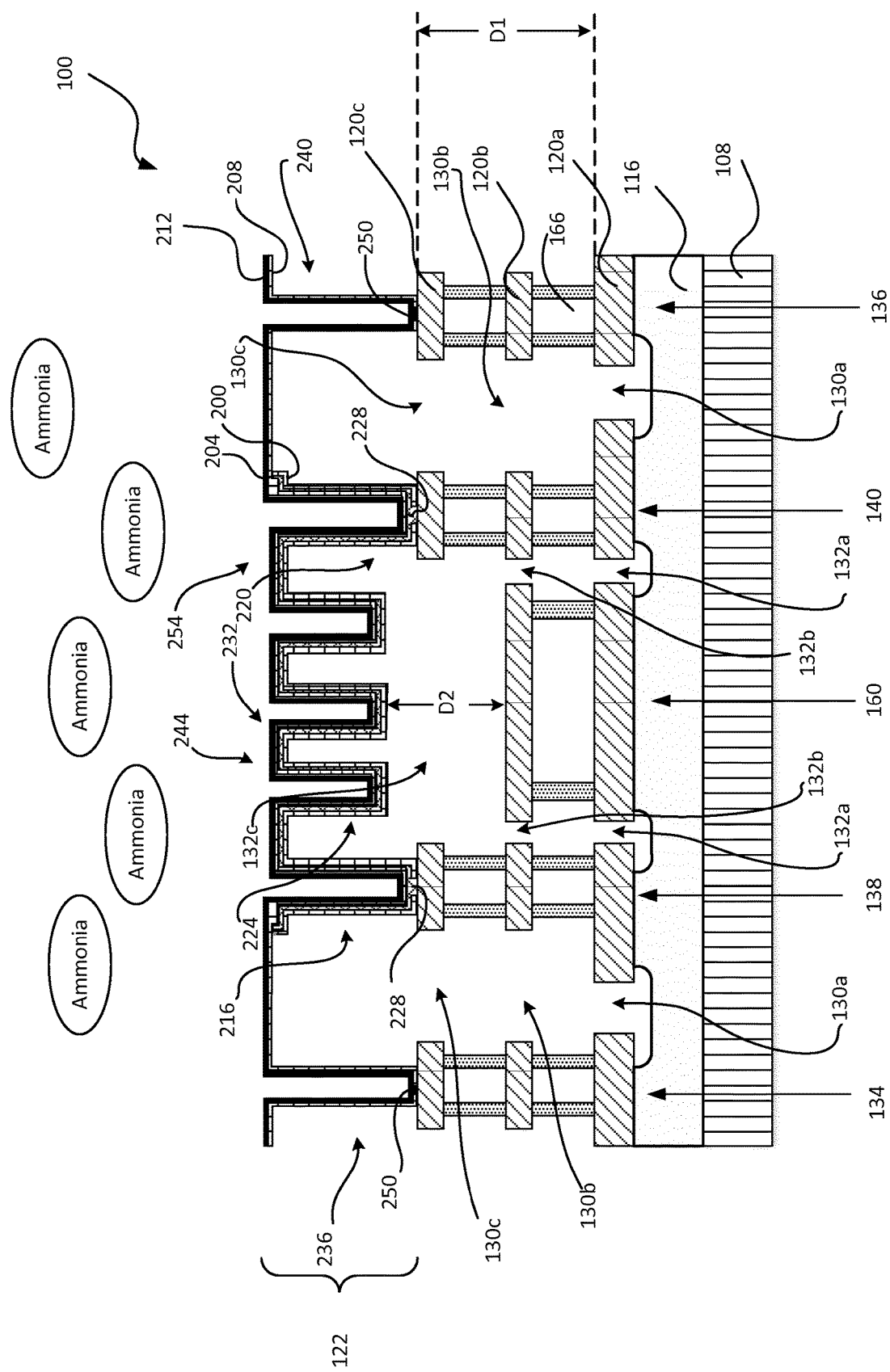

Now referring to FIG. 2E, a cross sectional view of the gas sensor device 100 that is substantially identical to the sensor device of FIG. 1, taken along a line similar to line V-V of FIG. 1. The gas sensor device 100 includes a substrate 108, an insulating layer 116, an electrically conductive layers, three conductive layers 120a-120c are illustrated, and a nanolaminated sensor portion 122 suspended above the conductive layers 120a-120c. The insulator layer 116, such as SiO$_2$ although any suitable electrically insulating material can be used is deposited over for example a Si-based substrate 108. Other desired type of substrate may be used depending on the application. The electrically conductive layers 120a-120c are formed over the insulator layer 106 by any deposition technique. The electrically conductive layers 120a-120c are formed from Pt. Openings 130a-130c formed in the conductive layers 120a-120c electrically isolate a left sensor pillar 134 and a right sensor pillar 136. Openings 132a-132c also formed in the conductive layers and the openings 130a-130c isolate a left heater pillar 138 and a right heater pillar 140. The pillars 134, 136, 138, and 140 each define a height that is configured to space the nanolaminated sensor portion 122 a first predetermined distance D1 from the conductive layer 120a and a second predetermined distance D2 from a table structure 160 locate between the heater pillars 138, 140. In some embodiments, the gas sensor device 100 does not include the table structure 160. In another embodiments, the gas sensor device 100 may include at least more than one of table structure, two pairs of sensor pillar and heat pillar, and/or extra sensor portion. In yet another embodiment, the sensor portion continuously suspended over more than two pairs of heater pillar and sensor pillar.

The pillars 134, 136, 138, and 140 are formed from any desired number of conductive layers 120 that results in the desired predetermined distances D1, D2. A respective conductive path 166 extends through each pillar 134, 136, 138, and 140 in order to electrically connect the conductive layers 120a-120c of each respective pillar. In some embodiment, the pillars 134, 136, 138, and 140 may be through vias and are filled with conductive material defines respective conductive path 166. The nanolaminated sensor portion 122 includes an insulator layer 200, a heater layer 204, a seed layer 208, and a gas sensitive structure 212. The insulator layer 200 extends from the heater pillar 138 to the heater pillar 140 and defines a left base portion 216, a right base portion 220, and a serpentine portion 224 extended between the left and right base portions 216, 220. The base portions 216, 220 are formed on the conductive layer 120c of the heater pillars 138, 140 and are configured to mechanically support the suspended serpentine portion 224 located at the second predetermined distance D2 from and above the table structure 160. The serpentine portion 224 defines a substantially U-shaped trench in cross section that provides mechanical stability to the nanolaminated sensor portion 122. Other geometry or configuration in trench is possible, depending on the application. The serpentine portion 224 also increases the available surface area for detecting a target gas. In one embodiment, the insulator layer 200 is formed from any suitable electrically insulative material that is configured to be deposited into a thin film using atomic layer deposition (ALD). In yet another embodiment, the nanolaminated sensor portion 122 does not include the insulator layer 200.

The heater layer 204 includes two contact portions 228 and a serpentine portion 232. Similar to the insulator layer 200, the heater layer 204 also extends from the heater pillar 138 to the heater pillar 140 and define the left base portion 216 and the right base portion 220. The serpentine portion 232, similar to the serpentine portion 224 of the insulator layer 200, is also extended between the base portions 216, 220. The contact portions 228 also define as part of the base portions 216, 220 are formed either on the insulator layer 204, the conductive layer 120c, or the combination thereof and are configured to electrically connect the heater layer 204 to the heater pillars 138, 140 such that electrical energy is configured to flow from the heater pillars 138, 140 through the serpentine portion 232. The shape of the heater layer 204 corresponds to the shape of the insulator layer 200; accordingly, the serpentine portion 232 defines a substantially U-shaped trench in cross section that may provide further mechanical stability to the nanolaminated sensor portion 122. In one embodiment, the heater layer 204 is formed from Pt. In another embodiment, the heater layer 204 is formed from any suitable electrically conductive material that is configured to be deposited into a thin film using ALD. In the illustrated embodiment, the heater layer 204 is prevented from extending from the heater pillar 138 to the sensor pillar 134 and from the heater pillar 140 to the sensor pillar 136.

The seed layer 208 extends from the sensor pillar 134 to the sensor pillar 136 and defines a left base portion 236, a right base portion 240, and a serpentine portion 244 extended from the base portion 236 to the base portion 240. The base portions 236, 240 are formed on the conductive layer 120c of the sensor pillars 134, 136 and are configured to mechanically support the suspended serpentine portion 244 located above the table structure 160. The seed layer 208 also corresponds to the shapes of the heater layer 204 and the insulator layer 200; accordingly, the serpentine portion 244 defines a substantially U-shaped trench in cross section that may provide further mechanical stability to the nanolaminated sensor portion 122. In one embodiment, the seed layer 208 is formed from alumina. In another embodiment, the seed layer 208 is formed from any suitable electrically insulative material that is configured to be deposited into a thin film using ALD. Although the seed layer 208 and the insulator layer 200 are formed from the same material, such as alumina, different choice of material types may be used on both the seed layer 208 and the insulator layer 200. For example, the seed layer 208 may be formed from aluminum oxide ($Al_2O_3$) and the insulator layer 200 may be formed from alumina instead. Additionally, the selection of the seed layer 208 is based on the desired porosity of the gas-sensitive layer 212. In some embodiments, the stacked insulating/heater/seed layers 200, 204, 208 is referred as first nanolaminate structure. The first nanolaminate structure includes alternating thin film layers of alumina/platinum/alumina 200, 204, 208 using ALD. Furthermore, in other embodiments, the first nanolaminate structure is formed from any desired material or materials that are configured to sense attributes such as Ethanol, liquid petroleum gas (LPG), and the like in the environment.

The gas-sensitive structure 212 (also referred to herein as a nanolaminated sensor structure) includes multilayer thin films that is formed on the seed layer 208 and is supported directly by the seed layer 208. The gas-sensitive structure 212 includes two contact portions 250 and a serpentine portion 254 configured to extend from the sensor pillar 134 to the sensor pillar 136. The contact portions 250 are formed on either the conductive layer 120c of the sensor pillars 134, 136, the seed layer 208, or the combination thereof and are configured to electrically connect the nanolaminated sensor structure 212 to the sensor pillars 134, 136, such that electrical energy is configured to flow from the sensor pillars 134, 136 through the serpentine portion 254. The seed layer 208 is configured to electrically isolate the sensor layer 212 from the heater layer 204. Accordingly, electrically energy is prevented from flowing to the nanolaminated sensor structure 212 from the heater pillars 138, 140. The shape of the nanolaminated sensor structure 212 corresponds to the shape of the seed layer 208; accordingly, the serpentine portion 254 defines a substantially U-shaped trench in cross section that may provide further mechanical stability to the nanolaminated sensor portion 122. In the illustrated embodiment, the nanolaminated sensor structure 212 is formed from stacked or alternated layers of binary oxides such as Tin Oxide/Chromium Oxide using ALD that is sensitive to Ethanol, liquid petroleum gas (LPG), and the like. In other embodiments, the nanolaminated sensor structure 212 is formed from any suitable material or materials that is sensitive to a target gas or gasses that is configured to be deposited into a laminate structure using ALD. As the nanolaminated sensor structure 212 absorbs the target gas or gasses, the absorption changes one or more properties that can be measured electrically, such as a change in conductivity. Thus, the nanolaminated sensor structure 212 is sometime referred as a control gate. Besides being sensitive to a target gas, the nanolaminated sensor structure 212 may also be configured as a heater in some embodiments of the gas sensor device 100 that do not include a heater layer 204. Details of the nanolaminated sensor structure 212 will be described below.

Figure 3:
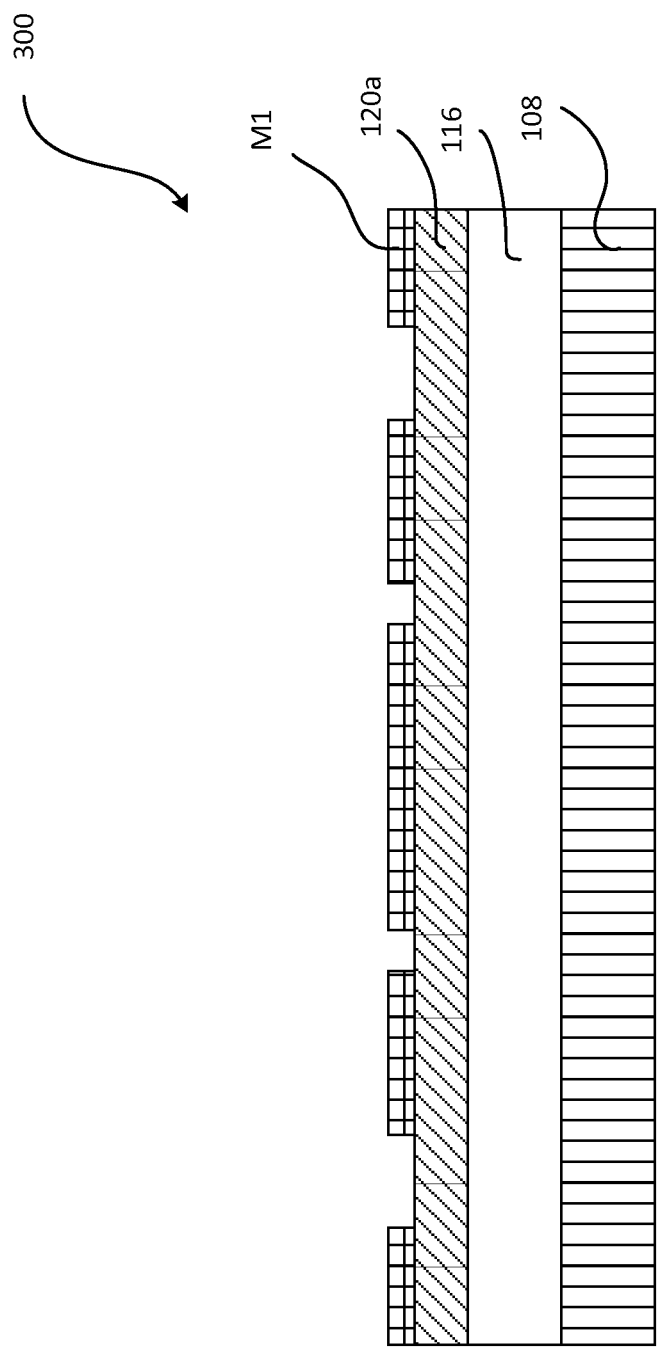
FIG. 3 is a cross sectional view taken along a line similar to line V-V of FIG. 1, showing a first resist pattern mask formed on a portion of a structural base of the environmental sensor.
Figure 4:
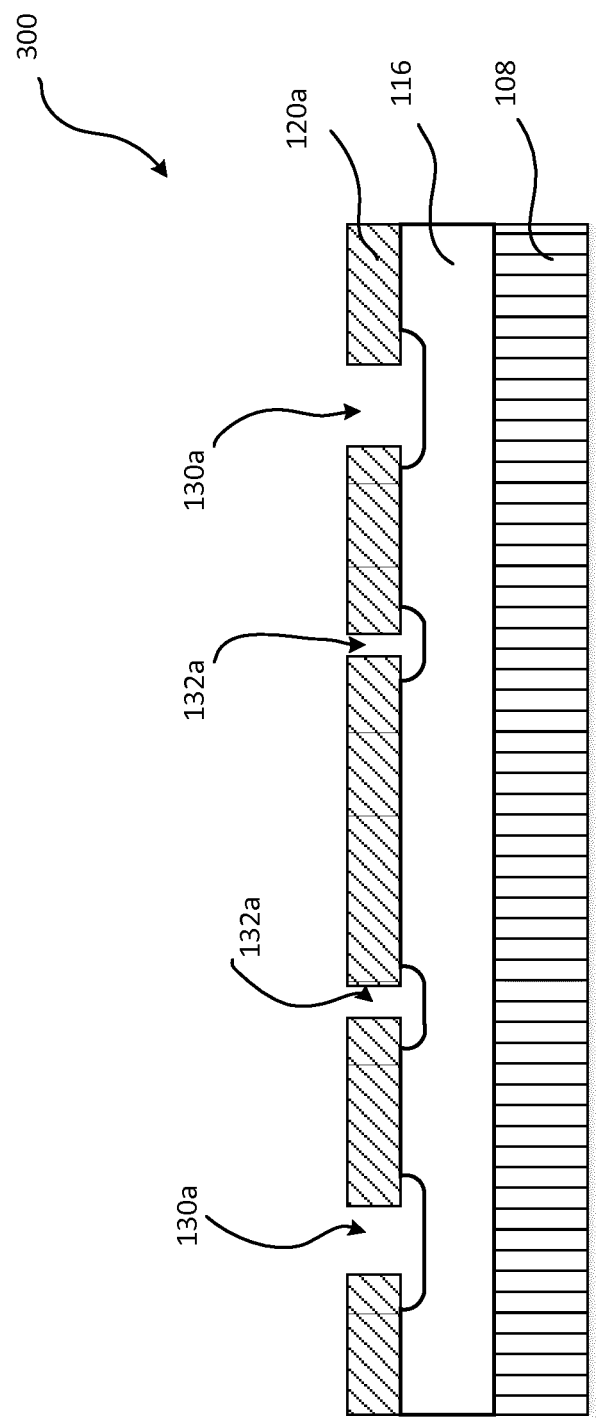
FIG. 4 is a cross sectional view taken along a line similar to line V-V of FIG. 1, showing openings or trenches formed on a portion of a structural base of the environmental sensor.
Figure 5:
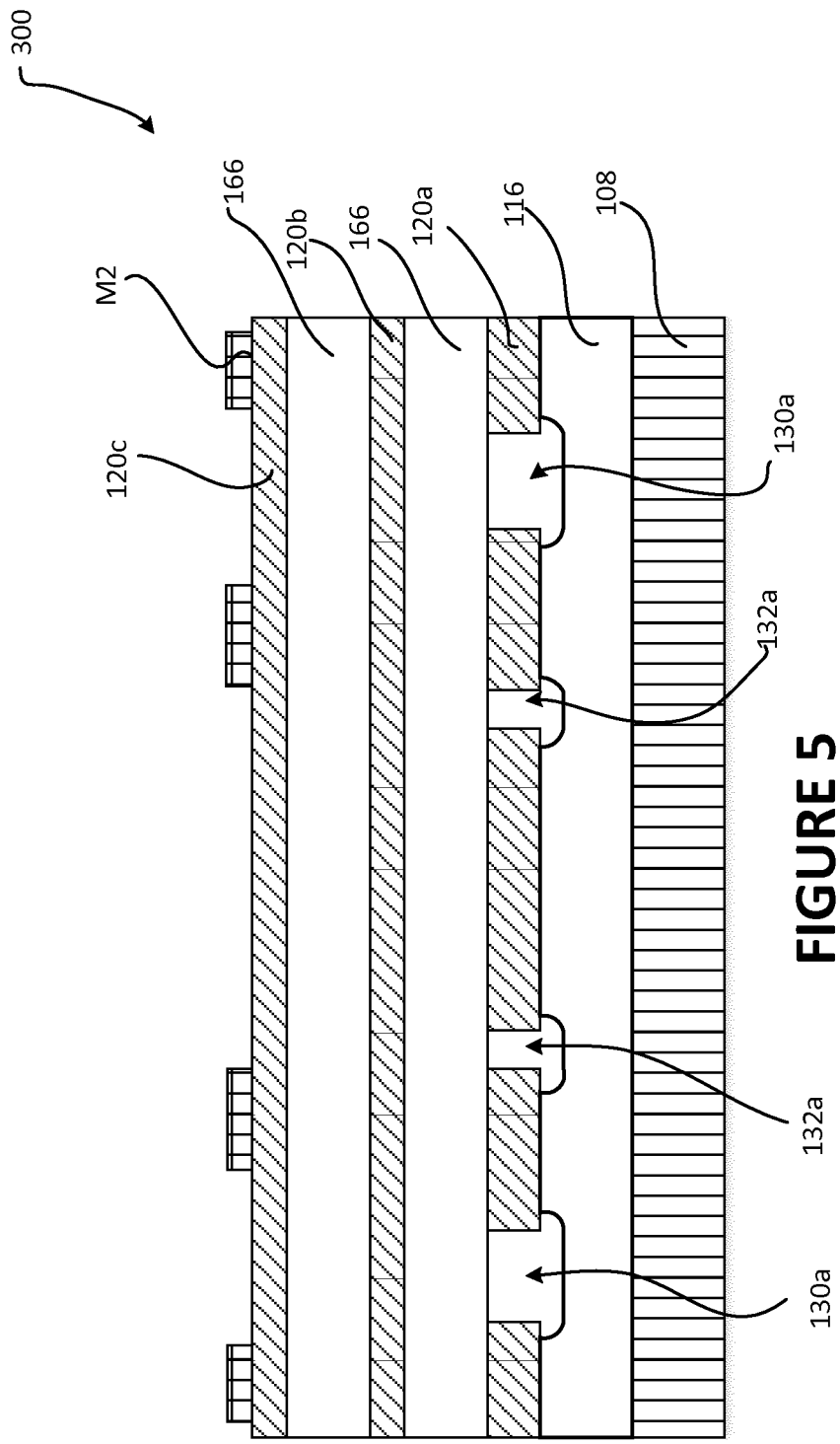
FIG. 5 is a cross sectional view taken along a line similar to line V-V of FIG. 1, showing a second resist pattern mask formed on remaining portion of the structural base of the environmental sensor.
Figure 6:
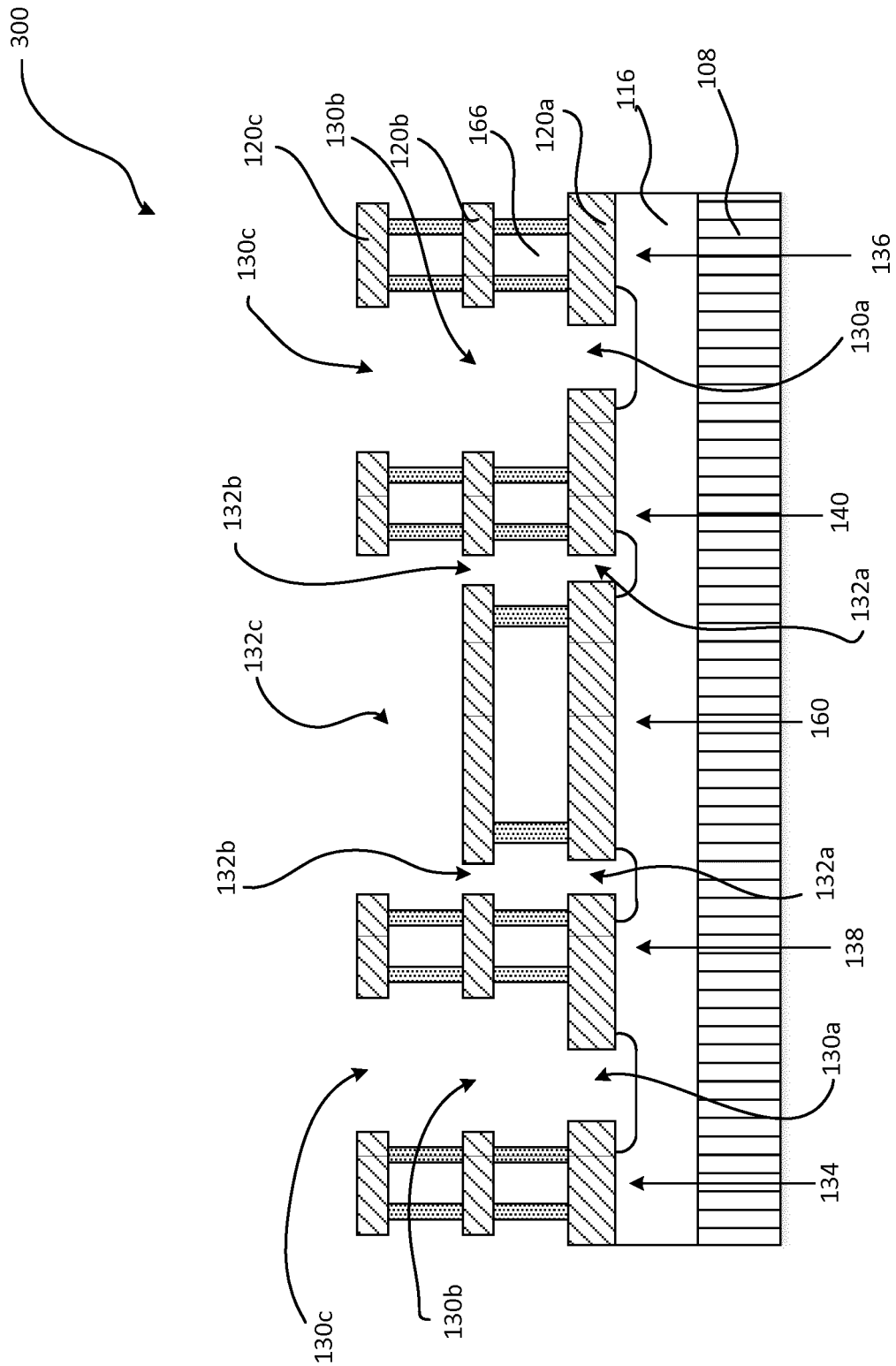
FIG. 6 is a cross sectional view taken along a line similar to line V-V of FIG. 1, showing openings or trenches formed on remaining portion of the structural base of the environmental sensor.

FIGS. 3-12 illustrate the method of fabricating the gas sensor device 100 of FIGS. 1 and 2A-2E according to an exemplary embodiment of the disclosure. A Si-based substrate 108 is provided as part of a structural base 300 of the device 100. An insulator layer 116 is deposited over the substrate 108. A first conductive layer 120a is deposited over the insulator layer 116. A first resist pattern mask M1 is placed over the first conductive layer 120a as depicted in FIG. 3. An etching process is performed on the structural base 300 for etching of its underlying layers 116, 120a. As illustrated in FIG. 4, various trenches or opening 130a and 132a are formed and portion of layers 116 and 120a are patterned. Conductive layers 166, 120b, 120c are deposited over the first conductive layer 120a. A second resist pattern mask M2 is placed over the third conductive layer 120c as depicted in FIG. 5. Openings or trenches 130b, 130c, 132, 132c are formed during etching process. Also, pillars 134, 136, 138, 140 and a table structure 160 are patterned thereafter as depicted in FIG. 6. First set of openings 130a, 130b, 130c formed between pillars 134 and 138 are fluidly coupled to each other. Similarly, second set of openings 130a, 130b, 130c formed between pillars 140 and 136 are also fluidly coupled to each other. Third set of openings 132a, 132b, 132c formed between pillars 138, 140 and the table structure 160 are also fluidly coupled to each other. In one embodiment, openings 130a-130c, 132a-132c may be formed in a single step to release pillars 134, 136, 138, 140, and the table structure 160. In another embodiment, openings 130a-130c, 132a-132c may be formed in multiple steps to release pillars 134, 136, 138, 140, and the table structure 160, depending on the application.

Figure 7:
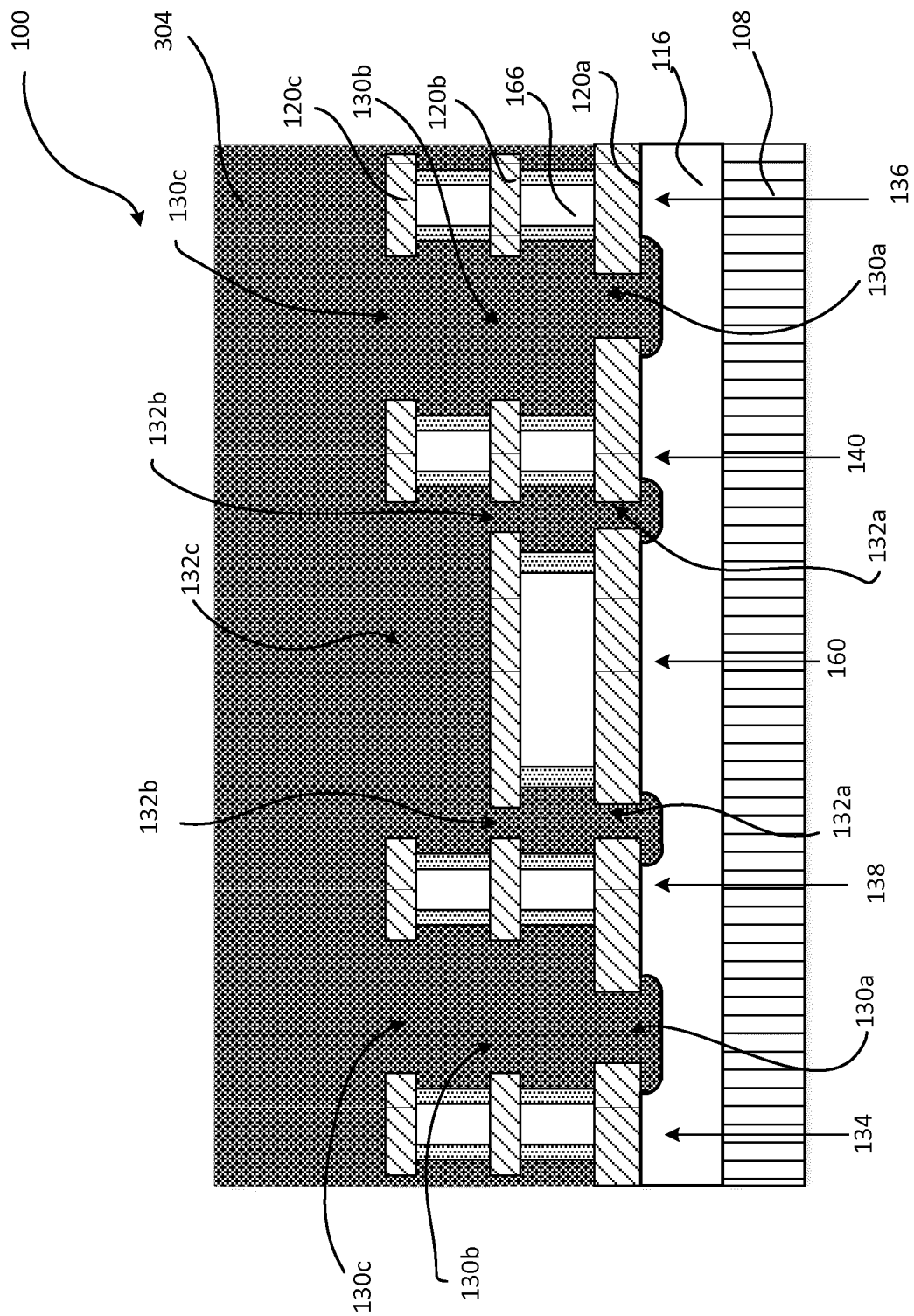
FIG. 7 is a cross sectional view taken along a line similar to line V-V of FIG. 1, showing a sacrificial layer formed on the structural base of the environmental sensor.
Figure 8:
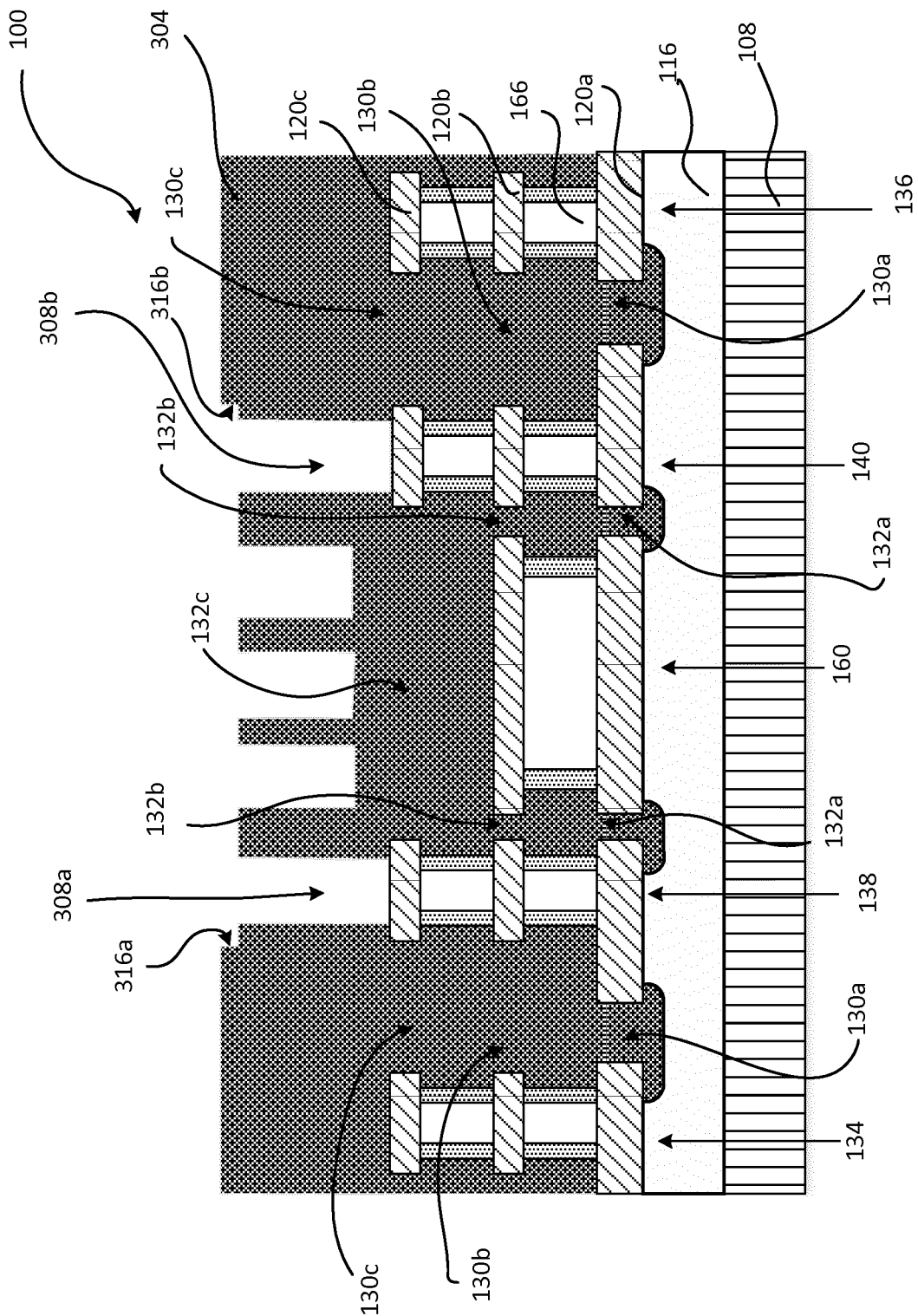
FIG. 8 is a cross sectional view taken along a line similar to line V-V of FIG. 1, showing a trench formed in the sacrificial layer.

As illustrated in FIG. 7, a sacrificial layer 304 is deposited over the structural base 300. The sacrificial layer 304 is patterned, with trenches for example, to define two heater trenches 308a, 308b, a serpentine trench 312 (similar in shape to the serpentine structure of FIG. 2), and two notches 316a, 316b as depicted in FIG. 8. The heater trenches 308a, 308b are configured to extend from the top of the sacrificial layer 304 to the conductive layer 120c of the heater pillars 138, 140. The serpentine trench 312 above the table structure 160 extends from the heater trench 308a to the other heater trench 308b. The notches 316a, 316b are configured to define left and right stopping points for the insulator layer 200 and the heater layer 204. As shown, the first notch 316a is adjacent to the heater trench 308a and the second notch 316b is adjacent to the heater trench 308b.

Figure 9:
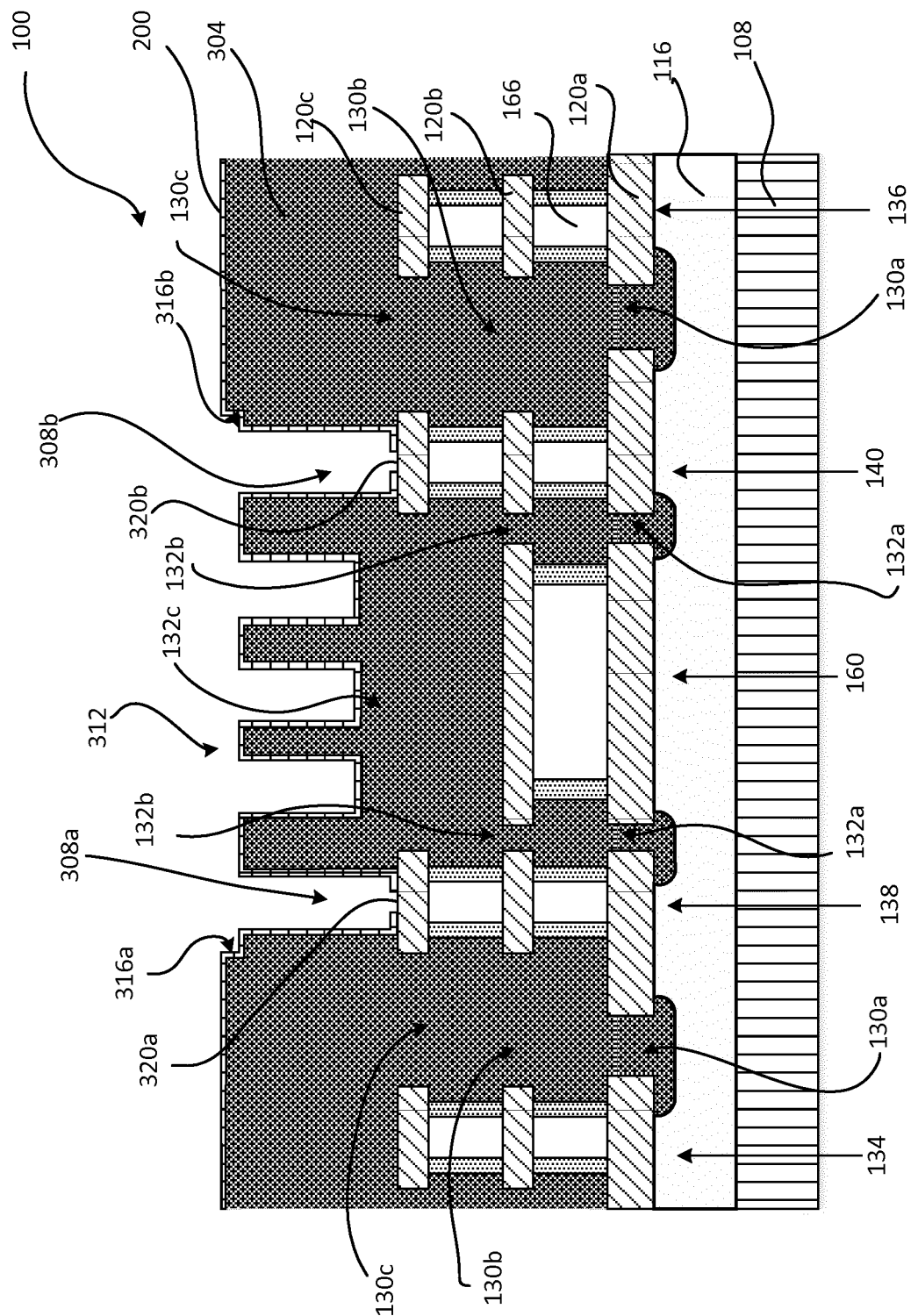
FIG. 9 is a cross sectional view taken along a line similar to line V-V of FIG. 1, showing an insulating layer formed on the sacrificial layer and in the trench of the sacrificial layer.

Now referring to FIG. 9, the insulating layer 200 is formed on the sacrificial layer 304. In one embodiment, ALD is used to form the insulating layer 200; however, any suitable chemical or physical process may be used. The insulator layer 200 is then patterned to define two heater openings 320a, 320b, located at the bottom of the openings 308a, 308b, that extend through the insulator layer 200 to a top surface of the conductive layer 120c. In some embodiment, the heater openings 320a, 320b may extend through the insulator layer 200 and through the top surface of the conductive layer 120c without exposing the conductive path 166 formed within the pillars 138, 140.

ALD is used to deposit materials by exposing a substrate to several different precursors sequentially. A typical deposition cycle begins by exposing a substrate to a precursor "A" which reacts with the substrate surface until saturation. This is referred to as a "self-terminating reaction." Next, the substrate is exposed to a precursor "B" which reacts with the surface until saturation. The second self-terminating reaction reactivates the surface. Reactivation allows the precursor "A" to react with the surface again. Typically, the precursors used in ALD include an organometallic precursor and an oxidizing agent such as water vapor or ozone. The deposition cycle results, ideally, in one atomic layer being formed on the substrate. Thereafter, another layer may be formed by repeating the process. Accordingly, the final thickness of the layer is controlled by the number of cycles the substrate is exposed to. Moreover, deposition using an ALD process is substantially unaffected by the orientation of the particular surface upon which material is to be deposited. Accordingly, an extremely uniform thickness of material may be realized both on the upper and lower horizontal surfaces as well as on the vertical surfaces.

Figure 10:
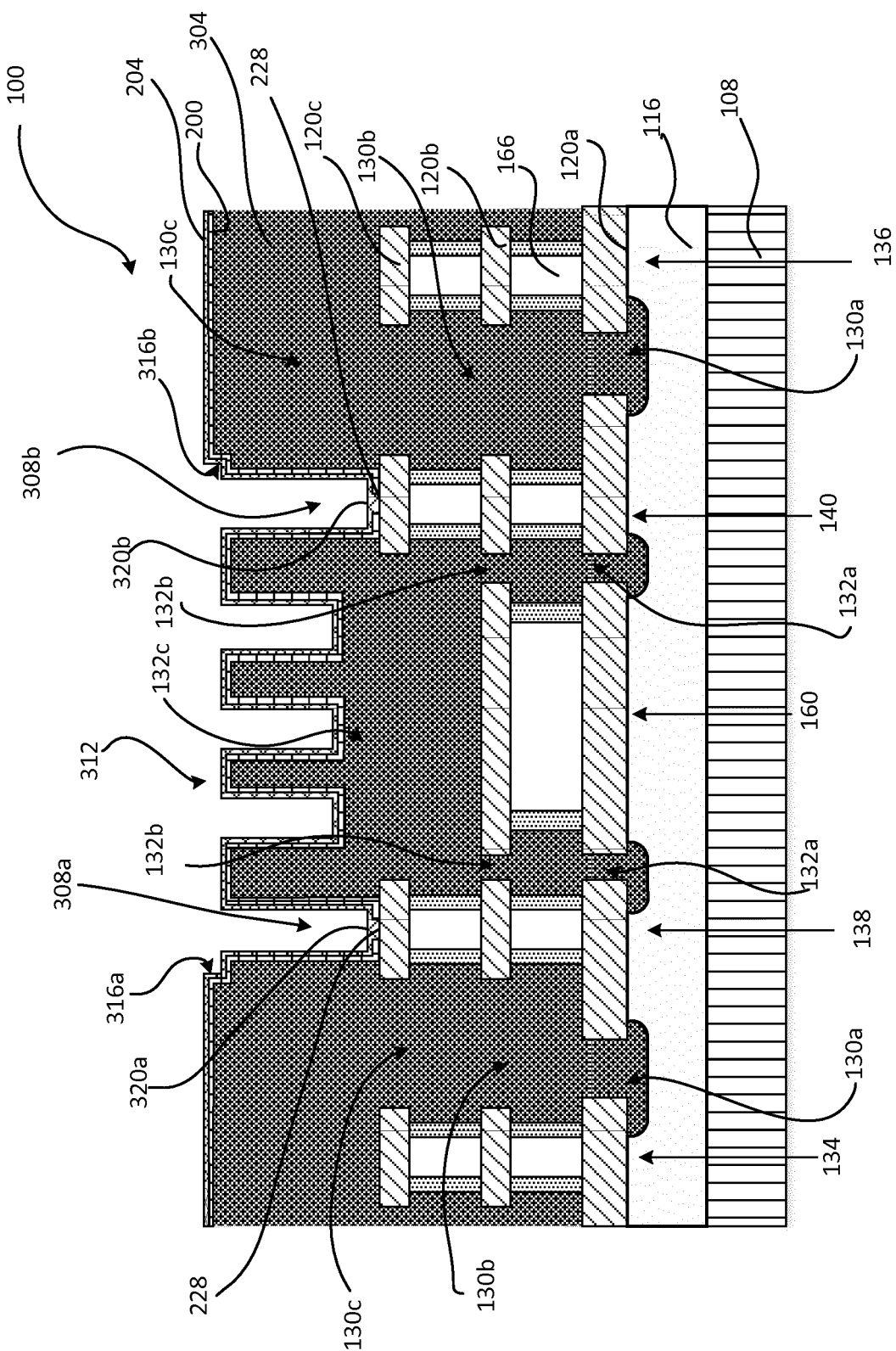
FIG. 10 is a cross sectional view taken along a line similar to line V-V of FIG. 1, showing a heater layer formed on the insulating layer.
Figure 11:
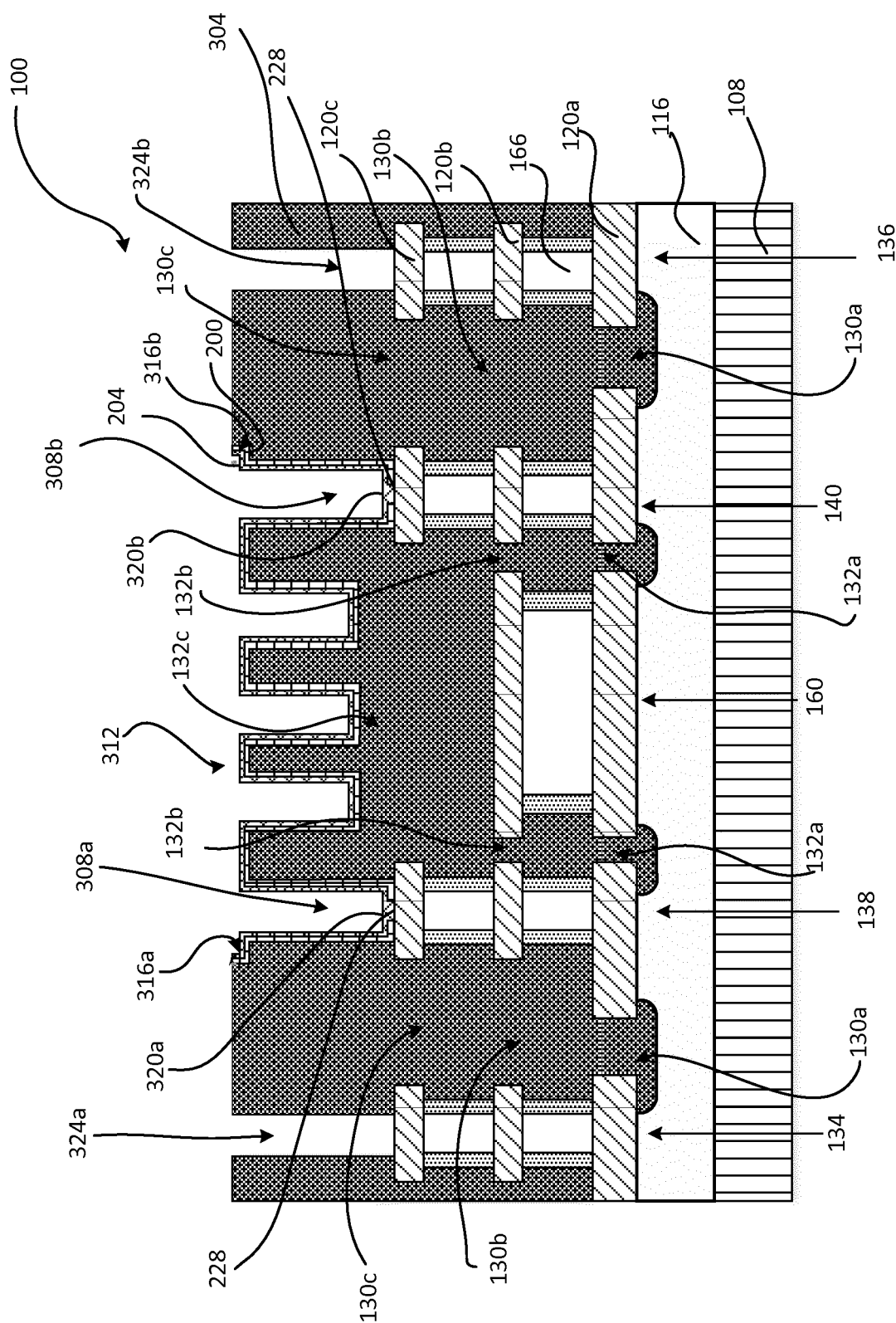
FIG. 11 is a cross sectional view taken along a line similar to line V-V of FIG. 1, showing the heater layer and the insulating layer after patterning thereof.

Thereafter, as depicted in FIG. 10, the heater layer 204 is formed on the insulator layer 200 using ALD; however, any suitable chemical or physical deposition process may be used, depending on the application. The material of the heater layer 204 is deposited into the heater openings 320a, 320b to form the contact portions 228, which are electrically connected to the conductive layer 120c of the pillars 138, 140. The sacrificial layer 304 is planarized as illustrated in FIG. 11, which includes removing portions of the insulator layer 200 and the heater layer 204 from the uppermost surface of the sacrificial layer 304 so that the uppermost surface of the sacrificial layer 304 is exposed. After planarization, the insulator layer 200 and the heater layer 204 only extend between the notches 316a, 316b. Any suitable process nay be used to planarize the insulator layer 200 and the heater layer 204 including chemical mechanical planarization (CMP). The sacrificial layer 304 is further patterned, with trenching for example, to define two sensor trenches 324a, 324b. The sensor trenches 324a, 324b are configured to extend from the top of the sacrificial layer 304 to a top surface of the conductive layer 120c of the sensor pillars 134, 136. In some embodiment, the sensor trenches 324a, 324b may extend from the top of the sacrificial layer 304 and through the top surface of the conductive layer 120c without exposing the conductive path 166 formed within the pillars 134, 136.

Figure 12:
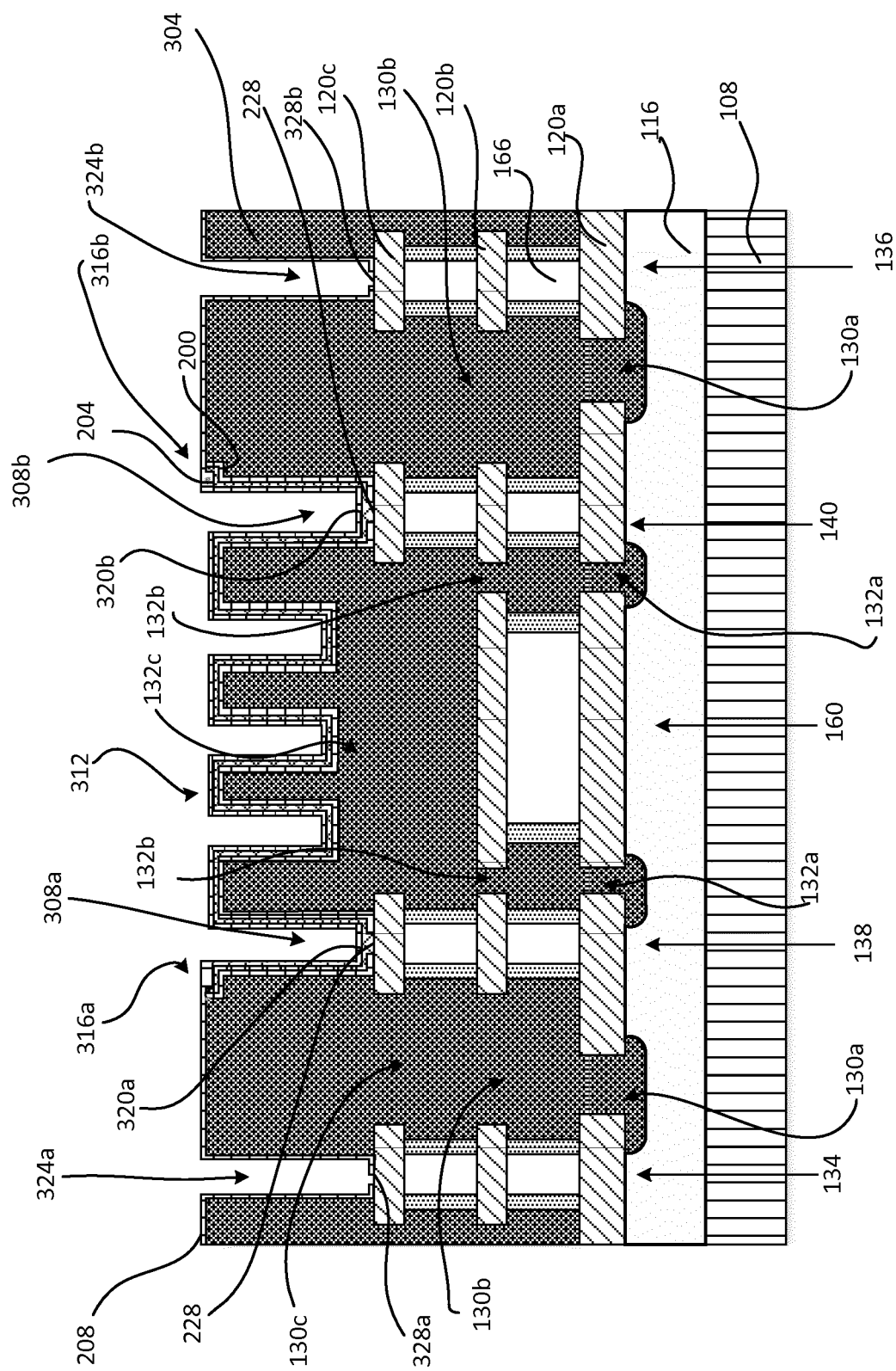
FIG. 12 is a cross sectional view taken along a line similar to line V-V of FIG. 1, showing a seed layer formed on the sacrificial layer and the heater layer.
Figure 13:
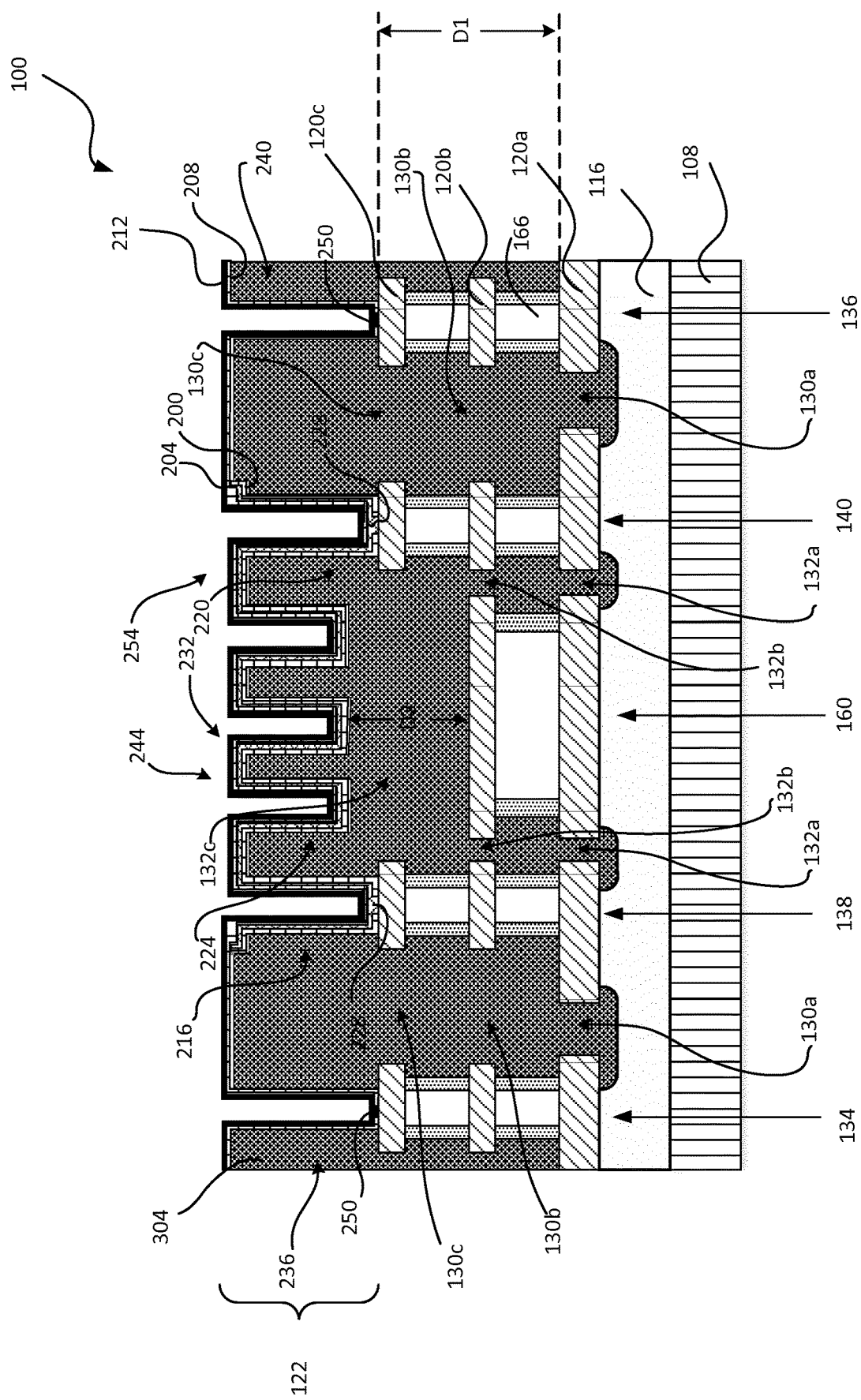
FIG. 13 is a cross sectional view taken along a line similar to line V-V of FIG. 1, showing a sensor layer formed on the seed layer.

Now referring to FIG. 12, the seed layer 208 is formed on the heater layer 204 using ALD; however, any suitable chemical or physical deposition process may be used. The material of the seed layer 208 is deposited into the sensor trenches 324a, 324b. The seed layer 208 is then patterned to define two sensor openings 328a, 328b, located at the bottom of the sensor trenches 324a, 324b, that extend through the seed layer 208 to the conductive layer 120c of the pillars 134, 136. The sensor layer 212 as illustrated in FIG. 13 is formed on the seed layer 208 using ALD from at least one of nanostructured nickel oxide, nanostructured cobalt oxide, nanostructured copper oxide, copper oxide/zinc oxide, tin oxide/chromium oxide; however, any suitable chemical or physical deposition process may be used. The material of the sensor layer 212 is deposited into the sensor openings 328a, 328b to form the contact portions 250, which are electrically connected to the conductive layer 120c of the pillars 134, 136 as depicted in FIGS. 2A-2E.

As described in FIG. 2A, nickel oxide is a suitable material for forming the sensor layer 212. In an exemplary embodiment, ALD is used to deposit nanostructured nickel oxide at a deposition temperature of 160° C. to 200° C. to form the sensor layer 212. Typically, the ALD deposited nickel oxide exhibits a high growth rate of approximately five nm/min and has excellent step coverage up to an aspect ratio of approximately 50:1. Therefore, forming the sensing layer 212 using ALD is much faster and simpler. Thus, ALD offers the fabricator the advantage of being able to form the sensor layer 212 quickly and easily.

After forming the sensor layer 212, the suspended sensor portion 122 may be patterned to finalize its serpentine shape. Then, sacrificial layer 304 is released or removed using xenon difluoride ($XeF_2$) or any other suitable release agent. Removal of the sacrificial layer 304 suspends the sensor portion 122 above the conductive layers 120a, 120b, and 120c.

Use of sensor device 100 includes applying an electrical current directly to the heater layer 204 through the heater pillars 138, 140 with an electrical energy source. In response to the electrical current, the heater layer 204, which operates as a Joule heater, quickly heats the sensor layer 212 to a desired sensing temperature (i.e. a predetermined temperature) that is based at least on a magnitude of the electrical energy source and an electrical resistance of the heater layer 204. A very low heating power is used to heat the sensor layer 212 (approximately 3.5 mW when heated to 350° C.) to the desired sensing temperature due to the sensor layer 212 being suspended and due to the sensor layer 212 being very thin. Also, the suspended structure enables the sensor layer 212 to be heated to a first temperature while enabling the substrate 108, the insulating layer 116, and the conductive layers 120a-120c to remain at a second temperature that is different (i.e. lower) than the first temperature. Since the sensor layer 212 is spaced apart from the insulator layer 116 and the substrate 108, substantially no heat energy is used to heat the insulator layer 116 and the substrate 108 during heating of the sensor layer 212. Although some of the heart energy developed by the heater layer 204 is used to heat the air surrounding the suspended sensor portion 122, substantially all of the heat energy is used to heat the sensor layer 212. Furthermore, the serpentine shape of the suspended sensor portion 122 results in the sensor layer 212 efficiently converting electrical energy into heat energy.

The sensor layer 212 is heated to the sensing temperature within a heating time period, which is referred to herein as a thermal time constant. The thermal time constant begins when electrical energy is applied to the heater layer 204 and ends when the sensor layer 212 is heated to the sensing temperature. Due at least to the thinness and the structure of the suspended sensor portion 122, the sensor device 100 has an extremely low thermal time constant on the order of 3 milliseconds. Accordingly, the low thermal time constant allows for duty cycling for low power operation (35 μW at 1% duty cycle). Furthermore, the sensor layer 212 is configured for fast temperature changes, ultimately resulting in fast detection of the target gas.

The sensing temperature of the sensor layer 212 of the gas sensor device 100 is based on properties of the target gasses and the environment or space in which the semiconductor sensor assembly is positioned. Exemplary sensing temperatures range from 150° C. to 500° C.; however, the sensor device 100 is configured to operate at any desired sensing temperature. In one embodiment, a sensing temperature 400° C. was determined to be a suitable sensing temperature for sensing carbon monoxide and nitrogen oxide with the sensor layer 212 formed from nanostructured nickel oxide.

After being heated to an operating temperature, the sensor device 100 is exposed to an environment in which the target gasses such as carbon monoxide and nitrogen oxide may or may not be present. Thereafter, an external read out circuit uses the electrical resistance of the sensor layer 212 as measured from the sensor pillar 134 to the sensor pillar 136 to determine if at least one or more of the target gasses are present in the environment. Specifically, a voltage drop across a reference resistor connected to in series with the sensor layer 212 is detected or monitored by the external circuit. In response to one or more of the target gasses, the electrical resistance of the sensor layer 212 changes, thereby impacting the voltage dropped across the reference resistor. Thus, the magnitude of the voltage dropped across the reference resistor is used to determine the concentration, presence, and/or absence of one or more of the target gasses in the environment. Accordingly, the read out circuit for the gas sensor device 100 is much simpler than the read out circuit that is configured to operate an optical based carbon monoxide/nitrogen oxide detector.

In addition to preparing the sensor layer 212 for detecting and/or exposure to one or more target gasses, the heater layer 204 may also be heated to "reset" the gas sensor device 100 through desorption. During desorption molecules are evacuated from the sensor layer 212 in order to prepare the gas sensor device 100 for sensing additional quantities of one or more target gasses.

As described above, ALD is used to form the sensor layer 212 from nanostructured nickel oxide. The nickel oxide is nanostructured in order for the material to achieve the desired sensing effects, because the sensitivity of nickel oxide to carbon monoxide and nitrogen oxide is a surface phenomenon and nanostructuring greatly increases the surface area of the material, yielding more surface area that gas molecules can activate. Typically, nanostructured nickel oxide includes nickel vacancies or interstitial oxygen atoms, thereby resulting in a material with semiconductor like electrical conductivity. Also, nanostructured nickel oxide functions as a p-type semiconductor having an electrical resistance that is based on the concentration of one or more gasses, i.e. carbon monoxide and nitrogen oxide in the environment to which it is exposed. In the present of one or more gasses, i.e. carbon monoxide and nitrogen oxide, the resistance of the nickel oxide sensor layer 212 increases and so the sensing current decreases.

The sensing effect of the nanostructured nickel oxide sensing layer 212 occurs in response to either gasses such as carbon monoxide and nickel oxide combining with $O^-$ (anion) radicals on the surface of the nickel oxide to form carbon dioxide, resulting in a decrease in $O^-$ density in the nickel oxide. The reduction in anion density leads to a reduction in the density of holes in the semiconductor sensor assembly, thereby increasing the electrical resistance of the nickel oxide. The sensor device 100 uses this effect to produce a carbon monoxide and nickel oxide sensor that exhibits a simple change in resistance.

In addition to being sensitive to carbon monoxide and nitrogen oxide, the nanostructured nickel oxide sensor layer 212 is also sensitive to humidity and other gases including hydrogen ($H_2$) and hydrogen based gasses. The sensitivity of nickel oxide to hydrogen is also a surface phenomenon. In particular, hydrogen reacts with oxygen radicals on the surface of nickel oxide to form water ($H_2O$) and to release electrons to the nickel oxide (that functions as a p-type semiconductor), which combine with electron holes in the material. The resulting reduction in the available electron holes increases the electrical resistance of the nickel oxide. As expected, the size and porosity of the grains of nickel oxide determine, at least in part, the sensitivity of the sensor layer 212 to hydrogen.

Returning to FIGS. 12 and 2B, after forming the sensor layer 212, the suspended sensor portion 122 may be patterned to finalize its serpentine shape. Then, sacrificial layer 304 is released or removed using xenon difluoride ($XeF_2$) or any other suitable release agent. Removal of the sacrificial layer 304 suspends the sensor portion 122 above the conductive layers 120a, 120b, and 120c.

Use of sensor device 100 includes applying an electrical current directly to the heater layer 204 through the heater pillars 138, 140 with an electrical energy source. In response to the electrical current, the heater layer 204, which operates as a Joule heater, quickly heats the sensor layer 212 to a desired sensing temperature (i.e. a predetermined temperature) that is based at least on a magnitude of the electrical energy source and an electrical resistance of the heater layer 204. A very low heating power is used to heat the sensor layer 212 (approximately 3.5 mW when heated to 350 degree Celsius) to the desired sensing temperature due to the sensor layer 212 being suspended and due to the sensor layer 212 being very thin. Also, the suspended structure enables the sensor layer 212 to be heated to a first temperature while enabling the substrate 108, the insulating layer 116, and the conductive layers 120a-120c to remain at a second temperature that is different (i.e. lower) than the first temperature.

Since the sensor layer 212 is spaced apart from the insulator layer 116 and the substrate 108, substantially no heat energy is used to heat the insulator layer 116 and the substrate 108 during heating of the sensor layer 212. Although some of the heart energy developed by the heater layer 204 is used to heat the air surrounding the suspended sensor portion 122, substantially all of the heat energy is used to heat the sensor layer 212. Furthermore, the serpentine shape of the suspended sensor portion 122 results in the sensor layer 212 efficiently converting electrical energy into heat energy.

The sensor layer 212 is heated to the sensing temperature within a heating time period, which is referred to herein as a thermal time constant. The thermal time constant begins when electrical energy is applied to the heater layer 204 and ends when the sensor layer 212 is heated to the sensing temperature. Due at least to the thinness and the structure of the suspended sensor portion 122, the sensor device 100 has an extremely low thermal time constant on the order of 3 milliseconds. Accordingly, the low thermal time constant allows for duty cycling for low power operation (35 μW at 1% duty cycle). Furthermore, the sensor layer 212 is configured for fast temperature changes, ultimately resulting in fast detection of the target gas.

The sensing temperature of the sensor layer 212 of the gas sensor device 100 is based on properties of the target gasses and the environment or space in which the semiconductor sensor assembly is positioned. Exemplary sensing temperatures range from 150° C. to 500° C.; however, the sensor device 100 is configured to operate at any desired sensing temperature. In one embodiment, a sensing temperature 400° C. was determined to be a suitable sensing temperature for sensing carbon monoxide and nitrogen oxide with the sensor layer 212 formed from nanostructured cobalt oxide.

After being heated to an operating temperature, the sensor device 100 is exposed to an environment in which the target gasses such as carbon monoxide and nitrogen oxide may or may not be present. Thereafter, an external read out circuit uses the electrical resistance of the sensor layer 212 as measured from the sensor pillar 134 to the sensor pillar 136 to determine if at least one or more of the target gasses are present in the environment. Specifically, a voltage drop across a reference resistor connected to in series with the sensor layer 212 is detected or monitored by the external circuit. In response to one or more of the target gasses, the electrical resistance of the sensor layer 212 changes, thereby impacting the voltage dropped across the reference resistor. Thus, the magnitude of the voltage dropped across the reference resistor is used to determine the concentration, presence, and/or absence of one or more of the target gasses in the environment. Accordingly, the read out circuit for the gas sensor device 100 is much simpler than the read out circuit that is configured to operate an optical based carbon monoxide/nitrogen oxide detector.

In addition to preparing the sensor layer 212 for detecting and/or exposure to one or more target gasses, the heater layer 204 may also be heated to "reset" the gas sensor device 100 through desorption. During desorption molecules are evacuated from the sensor layer 212 in order to prepare the gas sensor device 100 for sensing additional quantities of one or more target gasses.

As described above, ALD is used to form the sensor layer 212 from nanostructured cobalt oxide. The cobalt oxide is nanostructured in order for the material to achieve the desired sensing effects, because the sensitivity of cobalt oxide to carbon monoxide and nitrogen oxide is a surface phenomenon and nanostructuring greatly increases the surface area of the material, yielding more surface area that gas molecules can activate. Typically, nanostructured cobalt oxide functions as a p-type semiconductor having an electrical resistance that is based on the concentration of one or more gasses, i.e. carbon monoxide and nitrogen oxide in the environment to which it is exposed. In the present of one or more gasses, i.e. carbon monoxide and nitrogen oxide, the resistance of the cobalt oxide sensor layer 212 increases and so the sensing current decreases. In particular, the surface of nanostructured cobalt oxide contains chemisorbed oxygen that provides electron holes for conduction according to the following equation:

$$\frac{1}{2}O_2(g) \leftrightarrow O^-(ads) + h^+$$

The sensing effect of the nanostructured cobalt oxide sensing layer 212 occurs in response to carbon monoxide combining with $O^-$ (anion) radicals on the surface of the cobalt oxide to form carbon dioxide, resulting in a decrease in $O^-$ density in the cobalt oxide. The reduction in anion density leads to a reduction in the density of holes in the semiconductor sensor assembly, thereby reducing the electrical conductivity. As a result, the electrical resistance of the cobalt oxide sensing layer 212 increases according to the following equation:

$$CO(g) + O^-(ads) + h^+ \rightarrow CO_2(g)$$

The sensing effect of the nanostructured cobalt oxide sensor layer 212 occurs in response to nitrogen oxide combining with $O^-$ (anion) radicals on the surface of the cobalt oxide to form nitrogen dioxide, resulting in a decrease in $O^-$ density in the cobalt oxide. The reduction in anion density leads to a reduction in the density of holes in the semiconductor sensor assembly, thereby reducing the electrical conductivity. As a result, the electrical resistance of the cobalt oxide sensing layer 212 increases according to the following equation:

$$NO(g) + O^-(ads) + h^+ \rightarrow NO_2(g)$$

In addition to being sensitive to carbon monoxide and nitrogen oxide, the nanostructured cobalt oxide sensor layer 212 is also sensitive to humidity and other gasses including hydrogen ($H_2$) and hydrogen based gasses. The sensitivity of cobalt oxide to hydrogen is also a surface phenomenon. In particular, hydrogen reacts with oxygen radicals on the surface of cobalt oxide to form water ($H_2O$) and to release electrons to the cobalt oxide (that functions as a p-type semiconductor), which combine with electron holes in the material. The resulting reduction in the available electron holes increases the electrical resistance of the cobalt oxide. As expected, the size and porosity of the grains of cobalt oxide determine, at least in part, the sensitivity of the sensor layer 212 to hydrogen.

Returning to FIGS. 12 and 2C, after forming the sensor layer 212, the suspended sensor portion 122 may be patterned to finalize its serpentine shape. Then, sacrificial layer 304 is released or removed using any other suitable release agent. Removal of the sacrificial layer 304 suspends the sensor portion 122 above the conductive layers 120a, 120b, and 120c.

Use of sensor device 100 includes applying an electrical current directly to the heater layer 204 through the heater pillars 138, 140 with an electrical energy source. In response to the electrical current, the heater layer 204, which operates as a Joule heater, quickly heats the sensor layer 212 to a desired sensing temperature (i.e. a predetermined temperature) that is based at least on a magnitude of the electrical energy source and an electrical resistance of the heater layer 204. A very low heating power is used to heat the sensor layer 212 to the desired sensing temperature due to the sensor layer 212 being suspended and due to the sensor layer 212 being very thin. Also, the suspended structure enables the sensor layer 212 to be heated to a first temperature while enabling the substrate 108, the insulating layer 116, and the conductive layers 120a-120c to remain at a second temperature that is different (i.e. lower) than the first temperature. Since the sensor layer 212 is spaced apart from the insulator layer 116 and the substrate 108, substantially no heat energy is used to heat the insulator layer 116 and the substrate 108 during heating of the sensor layer 212. Although some of the heart energy developed by the heater layer 204 is used to heat the air surrounding the suspended sensor portion 122, substantially all of the heat energy is used to heat the sensor layer 212. Furthermore, the serpentine shape of the suspended sensor portion 122 results in the sensor layer 212 efficiently converting electrical energy into heat energy.

The sensor layer 212 is heated to the sensing temperature within a heating time period, which is referred to herein as a thermal time constant. The thermal time constant begins when electrical energy is applied to the heater layer 204 and ends when the sensor layer 212 is heated to the sensing temperature. Due at least to the thinness and the structure of the suspended sensor portion 122, the sensor device 100 has an extremely low thermal time constant on the order of 3 milliseconds. Accordingly, the low thermal time constant allows for duty cycling for low power operation (35 µW at 1% duty cycle). Furthermore, the sensor layer 212 is configured for fast temperature changes, ultimately resulting in fast detection of the target gas.

The sensing temperature of the sensor layer 212 of the gas sensor device 100 is based on properties of the target gasses and the environment or space in which the semiconductor sensor assembly is positioned. Exemplary sensing temperatures range from room temperature to 500° C.; however, the sensor device 100 is configured to operate at any desired sensing temperature.

After being heated to an operating temperature, the sensor device 100 is exposed to an environment in which the target gasses such as carbon monoxide, nitrogen oxide, and hydrogen sulfide may or may not be present. Thereafter, an external read out circuit uses the electrical resistance of the sensor layer 212 as measured from the sensor pillar 134 to the sensor pillar 136 to determine if at least one or more of the target gasses are present in the environment. Specifically, a voltage drop across a reference resistor connected to in series with the sensor layer 212 is detected or monitored by the external circuit. In response to one or more of the target gasses, the electrical resistance of the sensor layer 212 changes, thereby impacting the voltage dropped across the reference resistor. Thus, the magnitude of the voltage dropped across the reference resistor is used to determine the concentration, presence, and/or absence of one or more of the target gasses in the environment. Accordingly, the read out circuit for the gas sensor device 100 is much simpler than the read out circuit that is configured to operate an optical based carbon monoxide/nitrogen oxide/hydrogen sulfide detector.

In addition to preparing the sensor layer 212 for detecting and/or exposure to one or more target gasses, the heater layer 204 may also be heated to "reset" the gas sensor device 100 through desorption. During desorption molecules are evacuated from the sensor layer 212 in order to prepare the gas sensor device 100 for sensing additional quantities of one or more target gasses.

As described above, ALD is used to form the sensor layer 212 from nanostructured copper oxide. The copper oxide is nanostructured in order for the material to achieve the desired sensing effects, because the sensitivity of copper oxide to carbon monoxide, nitrogen oxide, and hydrogen sulfide is a surface phenomenon and nanostructuring greatly increases the surface area of the material, yielding more surface area that gas molecules can activate. Typically, nanostructured copper oxide functions as a p-type semiconductor having an electrical resistance that is based on the concentration of one or more gasses, i.e. carbon monoxide, nitrogen oxide, and hydrogen sulfide in the environment to which it is exposed. In the present of one or more gasses, i.e. carbon monoxide, nitrogen oxide, and hydrogen sulfide, the resistance of the copper oxide sensor layer 212 increases and so the sensing current decreases.

In addition to being sensitive to carbon monoxide, nitrogen oxide, and hydrogen sulfide, the nanostructured copper oxide sensor layer 212 is also sensitive to humidity and other gases including hydrogen ($H_2$) and hydrogen based gasses. The sensitivity of copper oxide to hydrogen is also a surface phenomenon. In particular, hydrogen reacts with oxygen radicals on the surface of copper oxide to form water ($H_2O$) and to release electrons to the copper oxide (that functions as a p-type semiconductor), which combine with electron holes in the material. The resulting reduction in the available electron holes increases the electrical resistance of the copper oxide. As expected, the size and porosity of the grains of copper oxide determine, at least in part, the sensitivity of the sensor layer 212 to hydrogen.

Figure 16:
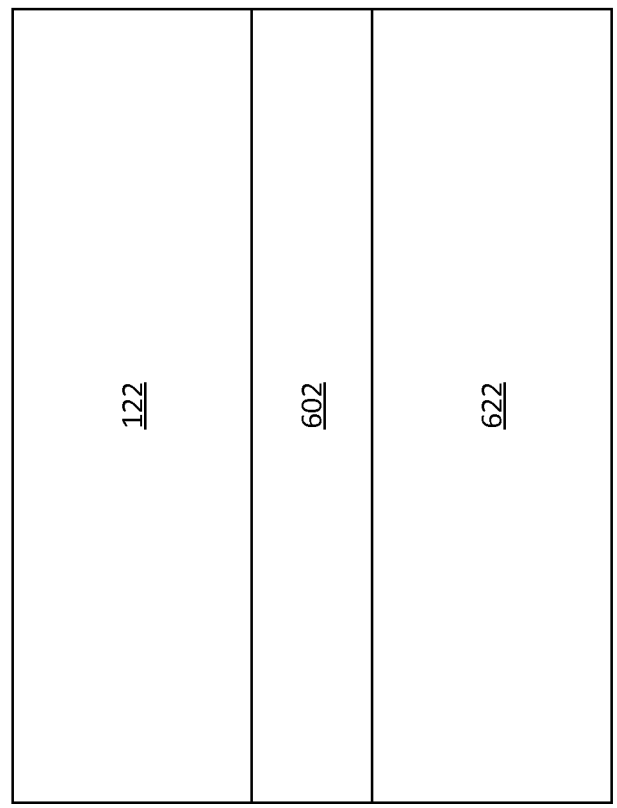
FIG. 16 is a simplified block diagram of two environmental sensor coupled to each other a common substrate.

Now referring to FIG. 16, a combo semiconductor sensor system 600 is provided. The system 600 includes a structural base assembly 602, a first sensor portion 122, and a second sensor portion 622. The structural base assembly 602 includes a substrate 108 and sensing and heating pillars as described in FIG. 2. A first set of sensing and heating pillars, similar to pillars 134, 136, 138, 140 as illustrated in FIG. 2 are disposed on top surface of the substrate 108. A second set of sensing and heating pillars, also similar to pillars 134, 136, 138, 140 as illustrated in FIG. 2 are disposed on bottom surface of the substrate 108. The first sensor portion 122 is suspended to the first set of the pillars and the second sensor portion 622 is suspended to the second set of the pillars. The first second sensor portion 122 and the second sensor portion 622 may either formed from same material and different material for sensing different/same target gas/gasses. Since both first and second sensor portion 122, 622 are disposed on the same structural base assembly 602, the overall size, in turn of the height, of the semiconductor sensor system 600 is reduced in order to fit in a tight space of an electronic device, for example.

Returning to FIGS. 12 and 2D, after forming the nanolaminated sensor structure 212, the nanolaminated sensor portion 122 suspended above the structural base 300 may be patterned to finalize its serpentine shape. Then, sacrificial layer 304 is released or removed using any other suitable release agent. Removal of the sacrificial layer 304 suspends the sensor portion 122 above the conductive layers 120a, 120b, and 120c.

Use of sensor device 100 includes applying an electrical current directly to the heater layer 204 through the heater pillars 138, 140 with an electrical energy source. In response to the electrical current, the heater layer 204, which operates as a Joule heater, quickly heats the sensor layer 212 to a desired sensing temperature (i.e. a predetermined temperature) that is based at least on a magnitude of the electrical energy source and an electrical resistance of the heater layer 204. A very low heating power is used to heat the nanolaminated sensor structure 212 to the desired sensing temperature due to the nanolaminated sensor structure 212 being suspended and due to the nanolaminated sensor structure 212 being very thin. Also, the suspended structure enables the nanolaminated sensor structure 212 to be heated to a first temperature while enabling the substrate 108, the insulating layer 116, and the conductive layers 120a-120c to remain at a second temperature that is different (i.e. lower) than the first temperature. Since the nanolaminated sensor structure 212 is spaced apart from the insulator layer 116 and the substrate 108, substantially no heat energy is used to heat the insulator layer 116 and the substrate 108 during heating of the nanolaminated sensor structure 212. Although some of the heart energy developed by the heater layer 204 is used to heat the air surrounding the nanolaminated sensor portion 122, substantially all of the heat energy is used to heat the nanolaminated sensor structure 212. Furthermore, the serpentine shape of the nanolaminated sensor portion 122 results in the nanolaminated sensor structure 212 efficiently converting electrical energy into heat energy.

The nanolaminated sensor structure 212 is heated to the sensing temperature within a heating time period, which is referred to herein as a thermal time constant. The thermal time constant begins when electrical energy is applied to the heater layer 204 and ends when the nanolaminated sensor structure 212 is heated to the sensing temperature. Due at least to the thinness and the structure of the suspended sensor portion 122, the sensor device 100 has an extremely low thermal time constant on the order of 3 milliseconds. Accordingly, the low thermal time constant allows for duty cycling for low power operation (35 µW at 1% duty cycle). Furthermore, the nanolaminated sensor structure 212 is configured for fast temperature changes, ultimately resulting in fast detection of the target gas.

The sensing temperature of the nanolaminated sensor structure 212 of the gas sensor device 100 is based on properties of the target gasses and the environment or space in which the semiconductor sensor assembly is positioned. Exemplary sensing temperatures range from room temperature to 500° C.; however, the sensor device 100 is configured to operate at any desired sensing temperature.

After being heated to an operating temperature, the sensor device 100 is exposed to an environment in which the target gasses such as ammonia may or may not be present. Thereafter, an external read out circuit uses the electrical resistance of the nanolaminated sensor structure 212 as measured from the sensor pillar 134 to the sensor pillar 136 to determine if at least one or more of the target gasses are present in the environment. Specifically, a voltage drop across a reference resistor connected to in series with the nanolaminated sensor structure 212 is detected or monitored by the external circuit. In response to one or more of the target gasses, the electrical resistance of the nanolaminated sensor structure 212 changes, thereby impacting the voltage dropped across the reference resistor. Thus, the magnitude of the voltage dropped across the reference resistor is used to determine the concentration, presence, and/or absence of one or more of the target gasses in the environment. Accordingly, the read out circuit for the gas sensor device 100 is much simpler than the read out circuit that is configured to operate an optical based ammonia detector.

In addition to preparing the nanolaminated sensor structure 212 for detecting and/or exposure to one or more target gasses, the heater layer 204 may also be heated to "reset" the gas sensor device 100 through desorption. During desorption molecules are evacuated from the nanolaminated sensor structure 212 in order to prepare the gas sensor device 100 for sensing additional quantities of one or more target gasses.

As described above, ALD is used to form the nanolaminated sensor structure 212 from copper oxide/zinc oxide. The copper oxide/zinc oxide layers are mutually inductive to sense ammonia using electrical resistance based read out circuit, as described below. Because of the semiconducting nature of the copper oxide-zinc oxide, the nanolaminated sensor structure 212 becomes more sensitive to ammonia.

Returning to FIGS. 12 and 2E, after forming the nanolaminated sensor structure 212, the nanolaminated sensor portion 122 suspended above the structural base 300 may be patterned to finalize its serpentine shape. Then, sacrificial layer 304 is released or removed using any other suitable release agent. Removal of the sacrificial layer 304 suspends the sensor portion 122 above the conductive layers 120a, 120b, and 120c.

Use of sensor device 100 includes applying an electrical current directly to the heater layer 204 through the heater pillars 138, 140 with an electrical energy source. In response to the electrical current, the heater layer 204, which operates as a Joule heater, quickly heats the sensor layer 212 to a desired sensing temperature (i.e. a predetermined temperature) that is based at least on a magnitude of the electrical energy source and an electrical resistance of the heater layer 204. A very low heating power is used to heat the nanolaminated sensor structure 212 to the desired sensing temperature due to the nanolaminated sensor structure 212 being suspended and due to the nanolaminated sensor structure 212 being very thin. Also, the suspended structure enables the nanolaminated sensor structure 212 to be heated to a first temperature while enabling the substrate 108, the insulating layer 116, and the conductive layers 120a-120c to remain at a second temperature that is different (i.e. lower) than the first temperature. Since the nanolaminated sensor structure 212 is spaced apart from the insulator layer 116 and the substrate 108, substantially no heat energy is used to heat the insulator layer 116 and the substrate 108 during heating of the nanolaminated sensor structure 212. Although some of the heart energy developed by the heater layer 204 is used to heat the air surrounding the nanolaminated sensor portion 122, substantially all of the heat energy is used to heat the nanolaminated sensor structure 212. Furthermore, the serpentine shape of the nanolaminated sensor portion 122 results in the nanolaminated sensor structure 212 efficiently converting electrical energy into heat energy.

The nanolaminated sensor structure 212 is heated to the sensing temperature within a heating time period, which is referred to herein as a thermal time constant. The thermal time constant begins when electrical energy is applied to the heater layer 204 and ends when the nanolaminated sensor structure 212 is heated to the sensing temperature. Due at least to the thinness and the structure of the suspended sensor portion 122, the sensor device 100 has an extremely low thermal time constant on the order of 3 milliseconds. Accordingly, the low thermal time constant allows for duty cycling for low power operation (35 µW at 1% duty cycle). Furthermore, the nanolaminated sensor structure 212 is configured for fast temperature changes, ultimately resulting in fast detection of the target gas.

The sensing temperature of the nanolaminated sensor structure 212 of the gas sensor device 100 is based on properties of the target gasses and the environment or space in which the semiconductor sensor assembly is positioned. Exemplary sensing temperatures range from room temperature to 500° C.; however, the sensor device 100 is configured to operate at any desired sensing temperature.

After being heated to an operating temperature, the sensor device 100 is exposed to an environment in which the target gasses such as Ethanol, liquid petroleum gas (LPG), and the like may or may not be present. Thereafter, an external read out circuit uses the electrical resistance of the nanolaminated sensor structure 212 as measured from the sensor pillar 134 to the sensor pillar 136 to determine if at least one or more of the target gasses are present in the environment. Specifically, a voltage drop across a reference resistor connected to in series with the nanolaminated sensor structure 212 is detected or monitored by the external circuit. In response to one or more of the target gasses, the electrical resistance of the nanolaminated sensor structure 212 changes, thereby impacting the voltage dropped across the reference resistor. Thus, the magnitude of the voltage dropped across the reference resistor is used to determine the concentration, presence, and/or absence of one or more of the target gasses in the environment. Accordingly, the read out circuit for the gas sensor device 100 is much simpler than the read out circuit that is configured to operate an optical based Ethanol, liquid petroleum gas (LPG), and the like detector.

In addition to preparing the nanolaminated sensor structure 212 for detecting and/or exposure to one or more target gasses, the heater layer 204 may also be heated to "reset" the gas sensor device 100 through desorption. During desorption molecules are evacuated from the nanolaminated sensor structure 212 in order to prepare the gas sensor device 100 for sensing additional quantities of one or more target gasses.

As described above, ALD is used to form the nanolaminated sensor structure 212 from Tin Oxide/Chromium Oxide. The Tin Oxide/Chromium Oxide oxide layers are mutually inductive to sense Ethanol, liquid petroleum gas (LPG), and the like using electrical resistance based read out circuit, as described below. Because of the semiconducting nature of the Tin Oxide/Chromium Oxide, the nanolaminated sensor structure 212 becomes more sensitive to Ethanol, liquid petroleum gas (LPG), and the like.

Figure 14A:
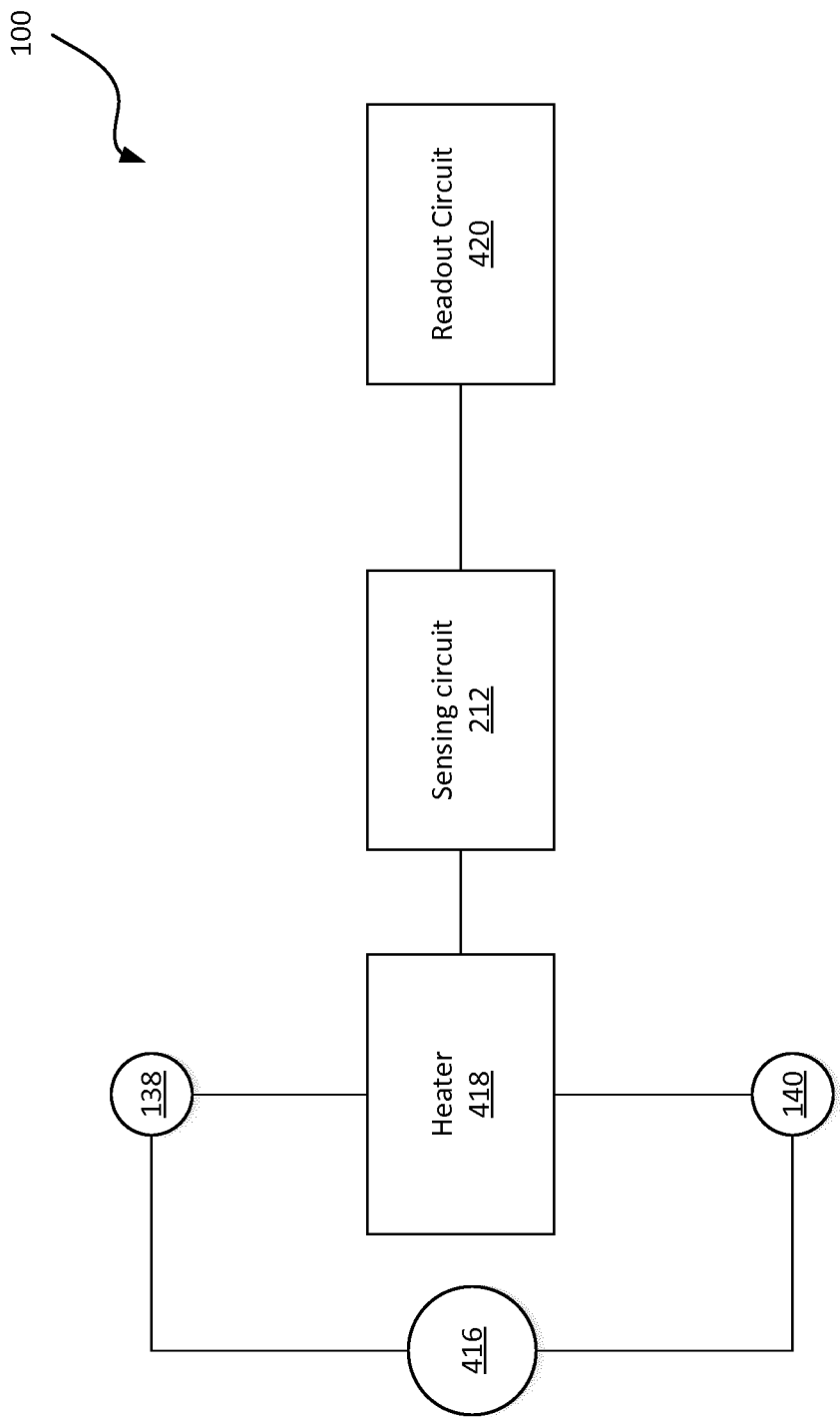
FIGS. 14A-14D are exemplary simplified block diagrams of an environmental sensor device.

Now referring to FIG. 14A, a simplified block diagram of an environmental sensor 100 of FIGS. 2A-2E coupled to a readout circuitry 420. An energy source 416 communicatively coupled to the heater pillars 138, 140 for heating a heater 418. The heater 418 is defined by the combination of the serpentine portions 224, 232, and 244 of the layers 200, 204, 208. The sensor layer 212 is heated to the sensing temperature within a heating time period, which is referred to herein as a thermal time constant. After being heated to an operating temperature, the sensor device 100 is exposed to an environment in which the target gasses such as carbon monoxide and nitrogen oxide may or may not be present. Thereafter, an external readout circuit 420 coupled to the sensor layer 212 uses the electrical resistance of the sensor layer 212 as measured to determine if at least one or more of the target gasses are present in the environment. Specifically, a voltage drop across a reference resistor connected to in series with the sensor layer 212 is detected or monitored by the readout circuit 420. In response to one or more of the target gasses, the electrical resistance of the sensor layer 212 changes, thereby impacting the voltage dropped across the reference resistor. Thus, the magnitude of the voltage dropped across the reference resistor is used to determine the concentration, presence, and/or absence of one or more of the target gasses in the environment. In addition to preparing the sensor layer 212 for detecting and/or exposure to one or more target gasses, the heater 418 may also be heated to "reset" the gas sensor device 100 through desorption. During desorption molecules are evacuated from the sensor layer 212 in order to prepare the gas sensor device 100 for sensing additional quantities of one or more target gasses.

Figure 15:
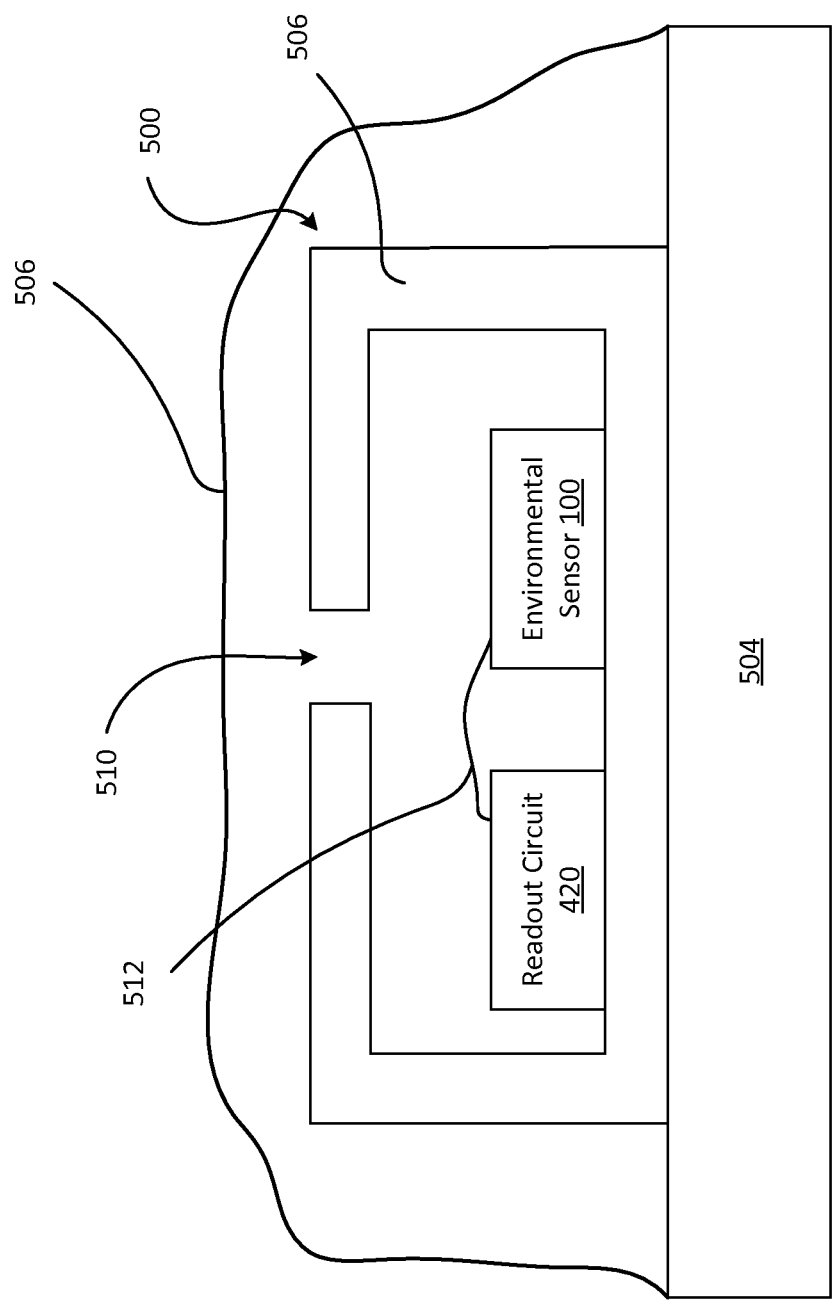
FIG. 15 is a cross sectional view of an exemplary environmental sensor package for encapsulating the environmental sensor device.

The semiconductor sensor assembly 100 may be disposed in a housing 502 to form a microelectromechanical system (MEMS) environmental sensor package 500. The semiconductor sensor assembly 100 converts a concentration of at least one or more specific gasses into an electrical signal to out the electrical signal. A circuit 420 such as a readout circuit 420 coupled to the semiconductor sensor assembly 100 via a wire 512 is disposed within the housing 502 of the sensor page 500. The readout circuit 420 processes the electrical signal received from the semiconductor sensor assembly 100. In some embodiment, the semiconductor sensor assembly 100 may be stacked and mounted on top of the readout circuit 420 instead of side-by-side configuration as depicted in FIG. 15. In another embodiment, the semiconductor sensor assembly 100 may be mounted on the opposite side of the readout circuit 420 so that both semiconductor sensor assembly 100 and the readout circuit 420 are not mounted on the same surface of the housing.

Figure 14B:
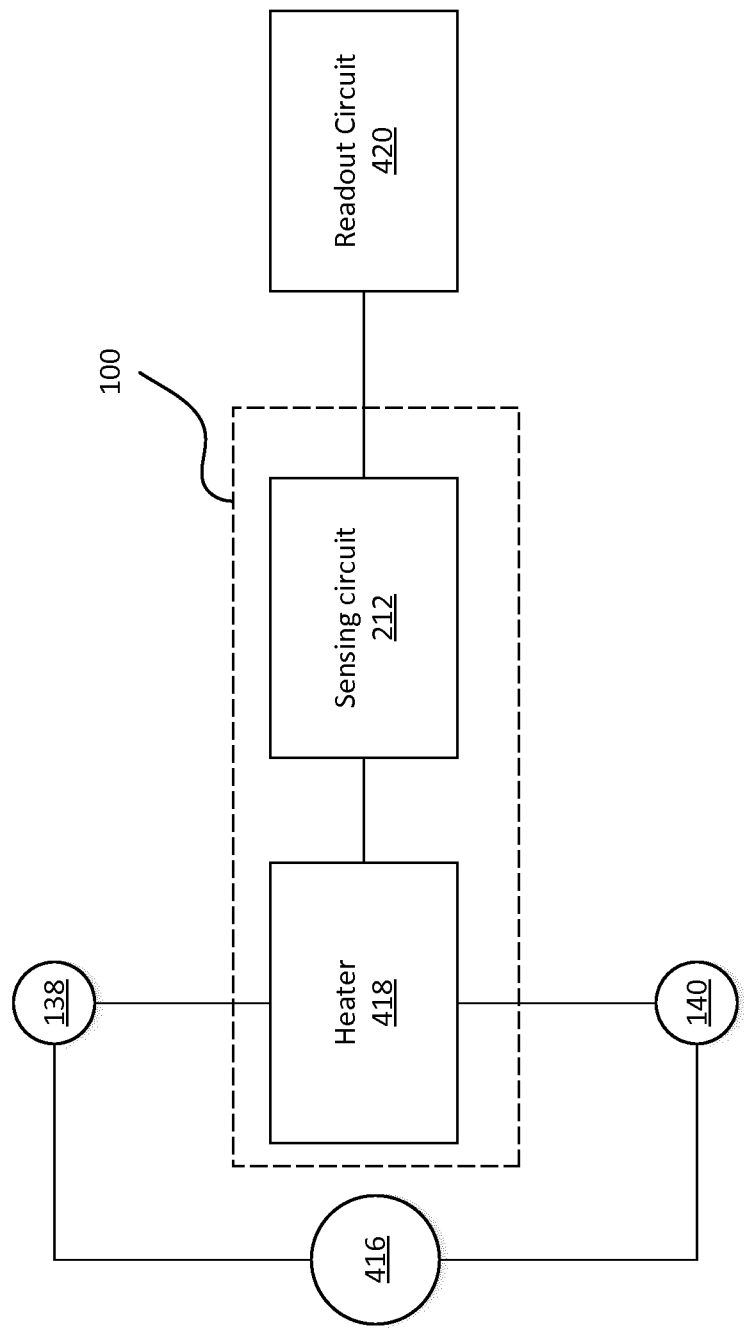
Figure 14C:
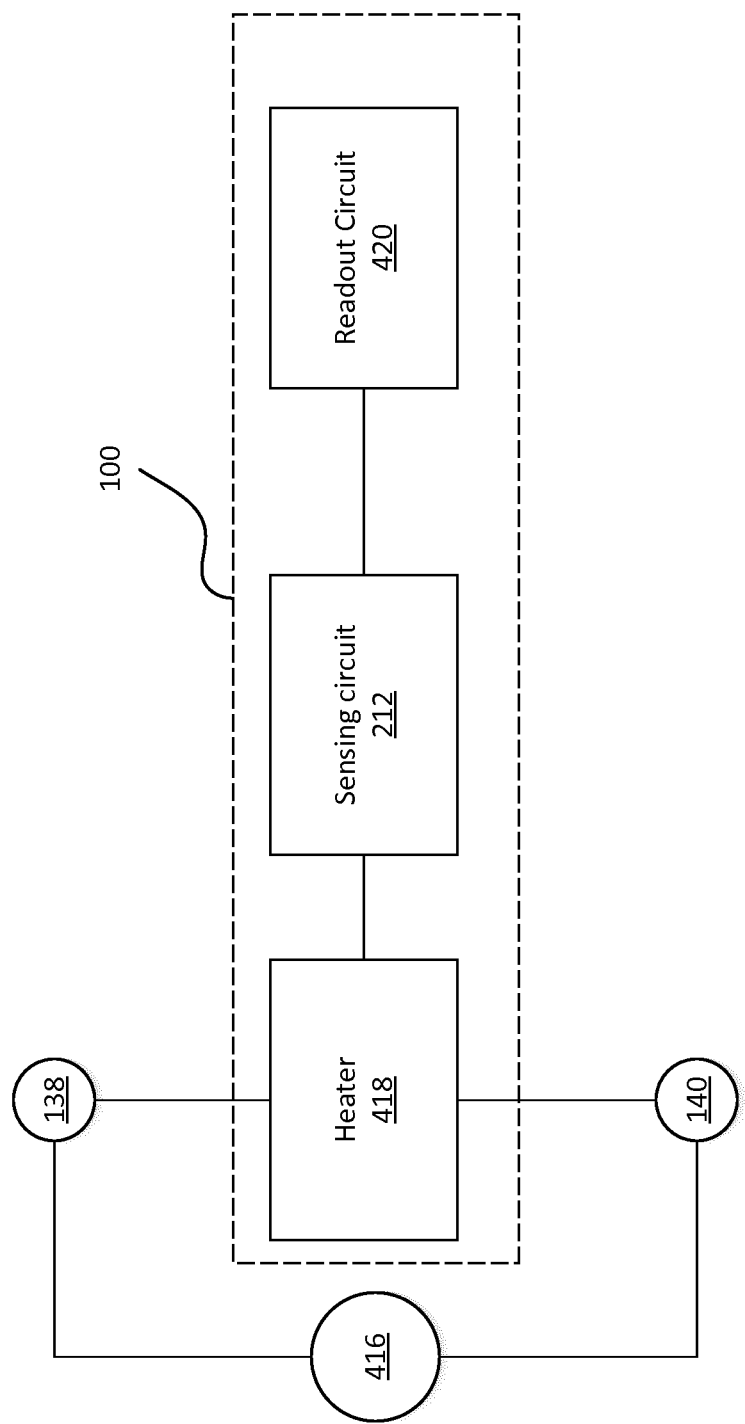
Figure 14D:
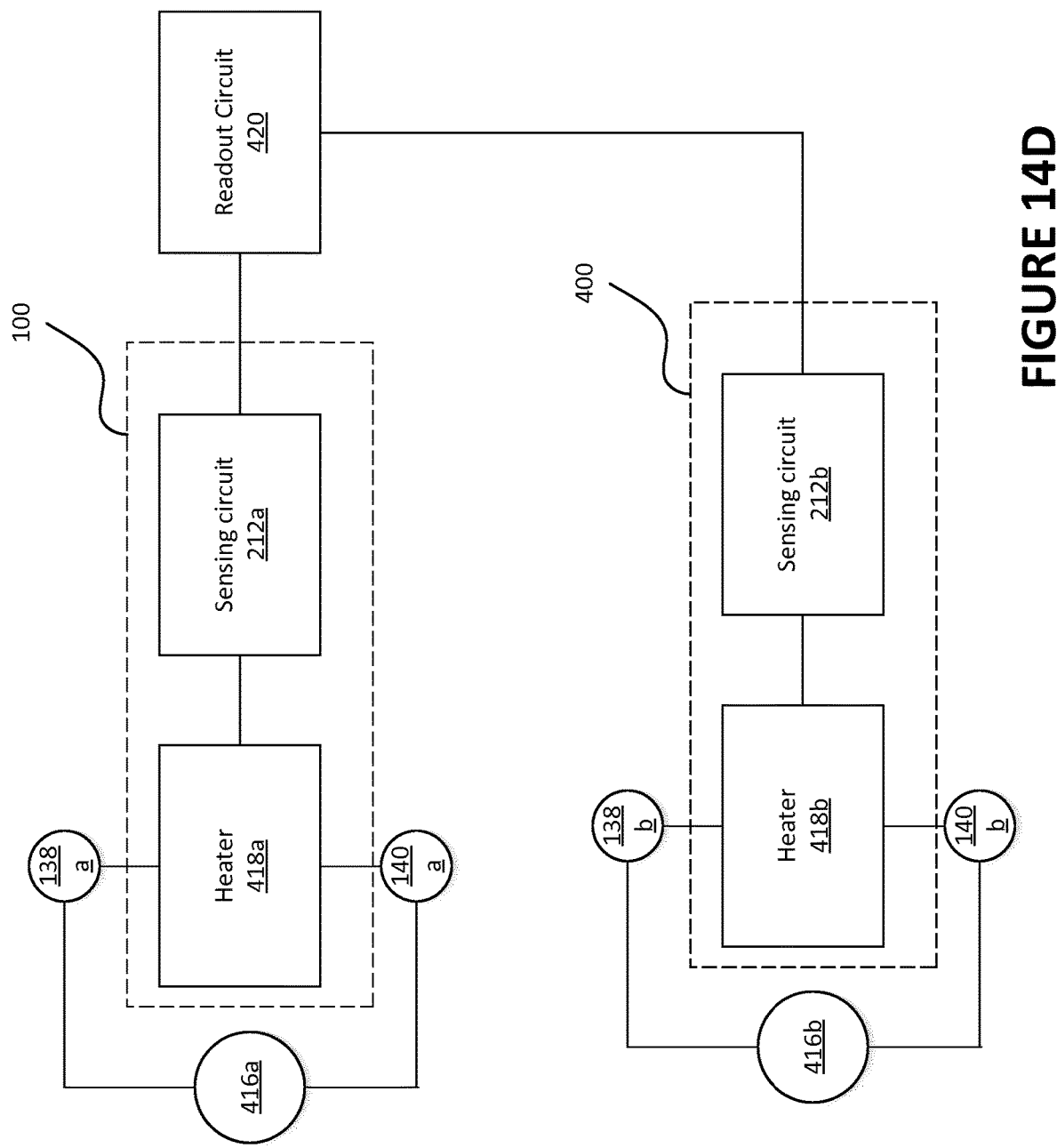

FIG. 14B is a simplified block diagram of an environmental sensor 100 of FIGS. 2A-2E coupled to a readout circuitry 420. An energy source 416 communicatively coupled to the heater pillars 138, 140 for heating a heater 418. The heater 418 is defined by the combination of the serpentine portions 224, 232, and 244 of the layers 200, 204, 208. The sensor layer (also referred as sensor circuit) 212 is heated to the sensing temperature within a heating time period, which is referred to herein as a thermal time constant. After being heated to an operating temperature, the sensor device 100 is exposed to an environment in which the target gasses such as carbon monoxide, nitrogen oxide, hydrogen sulfide, ammonia, Ethanol, liquid petroleum gas (LPG), and the like may or may not be present. Thereafter, an external readout circuit 420 coupled to the sensor layer 212 uses the electrical resistance of the sensor layer 212 as measured to determine if at least one or more of the target gasses are present in the environment. Specifically, a voltage drop across a reference resistor connected to in series with the sensor layer 212 is detected or monitored by the readout circuit 420. In response to one or more of the target gasses, the electrical resistance of the sensor layer 212 changes, thereby impacting the voltage dropped across the reference resistor. Thus, the magnitude of the voltage dropped across the reference resistor is used to determine the concentration, presence, and/or absence of one or more of the target gasses in the environment. In addition to preparing the sensor layer 212 for detecting and/or exposure to one or more target gasses, the heater 418 may also be heated to "reset" the gas sensor device 100 through desorption. During desorption molecules are evacuated from the sensor layer 212 in order to prepare the gas sensor device 100 for sensing additional quantities of one or more target gasses. As illustrated, the sensing circuit 212 disposed on the heater 418 which in turn disposed on the structural base 300 defined a semiconductor sensor assembly 100. An external readout circuit 420 is communicatively coupled to the semiconductor sensor assembly 100. In another embodiment, the readout circuit 420 communicatively coupled to the sensing circuit 212 may be integrated into the same assembly 100 as depicted in FIG. 14C. In yet another embodiment, two or more semiconductor sensor assemblies 100, 400 may be communicatively coupled to the readout circuit 420 as depicted in FIG. 14D.

The semiconductor sensor assembly 100 may be disposed in a housing 502 to form a microelectromechanical system (MEMS) environmental sensor package 500. The semiconductor sensor assembly 100 converts a concentration of at least one or more specific gasses into an electrical signal to out the electrical signal. A circuit 420 such as a readout circuit 420 coupled to the semiconductor sensor assembly 100 via a wire 512 is disposed within the housing 502 of the sensor page 500. The readout circuit 420 processes the electrical signal received from the semiconductor sensor assembly 100. In some embodiment, the semiconductor sensor assembly 100 may be stacked and mounted on top of the readout circuit 420 instead of side-by-side configuration as depicted in FIG. 15. In another embodiment, the semiconductor sensor assembly 100 may be mounted on the opposite side of the readout circuit 420 so that both semiconductor sensor assembly 100 and the readout circuit 420 are not mounted on the same surface of the housing. As shown in FIG. 15, the environmental sensor package 500 is mounted on a printed circuit board 504 of a device 506 such as electronic devices, HVAC systems, security systems, environmental devices, fuel cell systems, air quality monitoring systems, automobile exhaust systems, breath analysis devices, home appliances, earpieces, headsets, hearing aids, and the like. The electronic devices may be a cellular phone, a tablet, a personal computer, a laptop, a wireless device, a portable or handheld music player, a camera, a GPS receiver, a navigation system, a projector, a wearable device, a personal digital assistant (PDA), a gaming console, and the like. An optional port 510 may be provided on the housing to receive at least one or more gasses. In some embodiment, more than one port or vent may be provided on the housing 502. The housing 502 may be formed from materials such as plastic, ceramic, organic, copper, FR4, leadframe and the like. In some embodiments, the housing 502 may be a molded housing with cavity for receiving the semiconductor sensor assembly 100. In other embodiment, more the one housing may be provided, depending on the application. For example, an assembly may include an inner housing and an outer housing encapsulated around the inner housing. In some embodiment, more than one inner housing may be disposed within the outer housing. More than one inner housing may be in stack configuration, side-by-side configuration, back-to-back configuration, back-to-front configuration, a tandem configuration, and the like. The housing 502 may comprise of a cover and a base coupled to the cover by any attachment techniques. In some embodiment, the housing 502 may comprise of a top member, a base member, and a spacer attached the top member to the base member by any attachment techniques. More than three-piece housing may be provided to encapsulate one or more environmental and non-environmental sensors and dies, depending on the application. The housing 502 as illustrated includes one cavity, however, more than one cavity may be provided depending on the application. The sensors and/or dies may be, an acoustic sensor, a microphone, a speaker, a receiver, an imaging sensor, a RF sensor, an antenna sensor, a thermal sensor, a pressure sensor, an optical sensor, a bolometer, an accelerometer, a gyroscope, a microprocessor, an ASIC, an IC, the combination thereof, and the like. More than one environmental sensor package 500 may be provided in the device 506. In some embodiment, the housing 502 is a housing of the device 506. In another embodiment, the housing 502 may be formed as part of the device housing.

Now referring to FIG. 16, a combo semiconductor sensor system 600 is provided. The system 600 includes a structural base assembly 602, a first sensor portion 122, and a second sensor portion 622. The structural base assembly 602 includes a substrate 108 and sensing and heating pillars as described in FIGS. 2A-2E. A first set of sensing and heating pillars, similar to pillars 134, 136, 138, 140 as illustrated in FIG. 2 are disposed on top surface of the substrate 108. A second set of sensing and heating pillars, also similar to pillars 134, 136, 138, 140 as illustrated in FIG. 2 are disposed on bottom surface of the substrate 108. The first sensor portion 122 is suspended to the first set of the pillars and the second sensor portion 622 is suspended to the second set of the pillars. The first second sensor portion 122 and the second sensor portion 622 may either formed from same material and different material for sensing different/same target gas/gasses. Since both first and second sensor portion 122, 622 are disposed on the same structural base assembly 602, the overall size, in turn of the height, of the semiconductor sensor system 600 is reduced in order to fit in a tight space of an electronic device, for example. In some embodiments, the first and second sensor portion 122, 622 may be formed from alternated layers of at least one of nickel oxide, cobalt oxide, copper oxide, copper oxide/zinc oxide, tin oxide/chromium oxide, or the like.

Figure 17A:
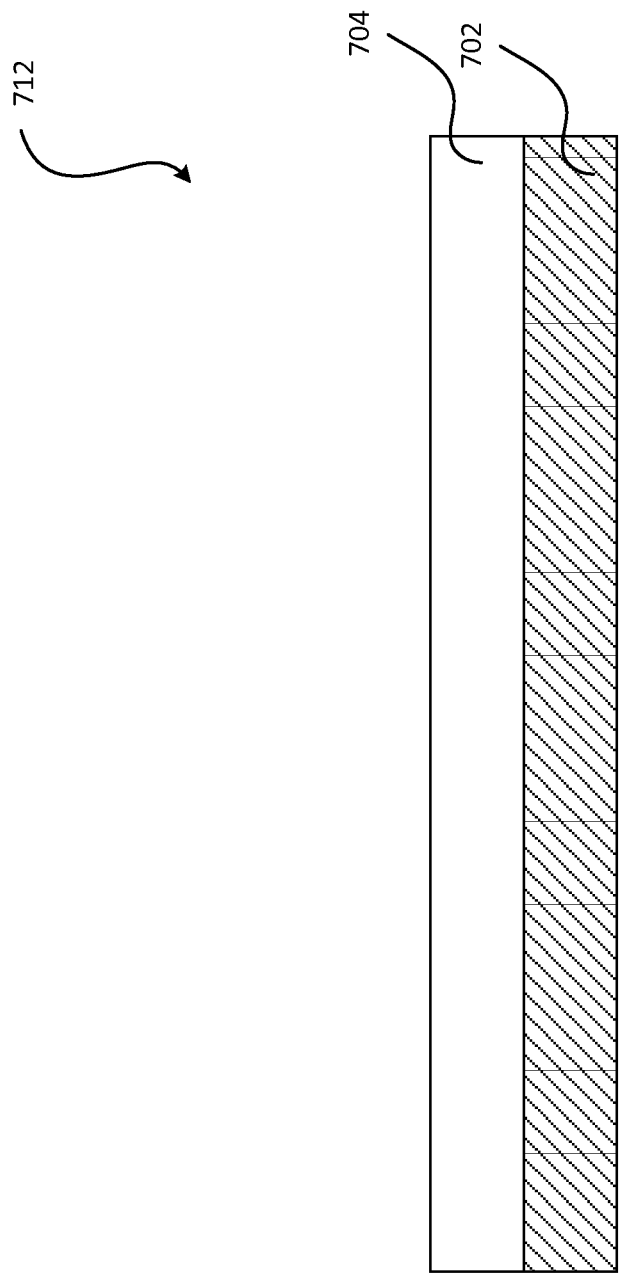
FIG. 17A is a cross sectional view of an exemplary nanolaminated sensor structure including at least one of Copper Oxide, Zinc Oxide, Tin Oxide, Chromium Oxide bilayers.
Figure 17B:
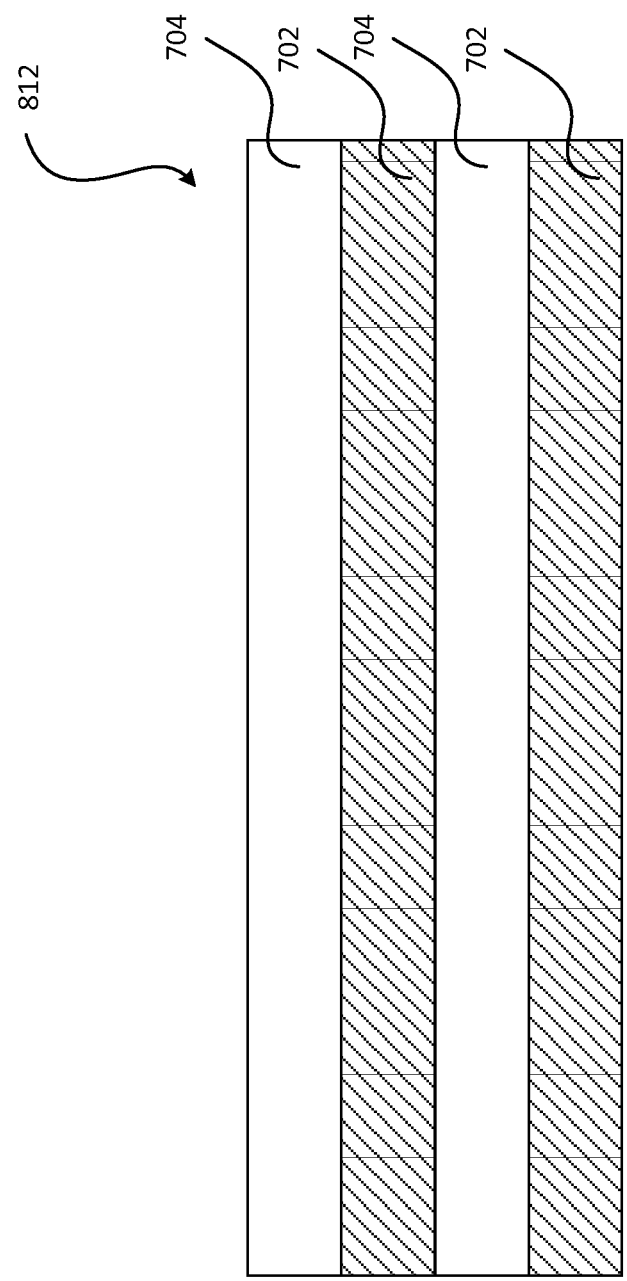
FIG. 17B is a cross sectional view of an exemplary nanolaminated sensor structure including multiple layers of alternating Copper Oxide, Zinc Oxide, Tin Oxide, Chromium Oxide bilayers.

Now referring to FIG. 17A, a stacked or nanolaminated sensor structure 712, similar to stacked or nanolaminated sensor structure 212 of an environmental sensor device 100. The sensor structure 712 includes first thin layer 702 and a second thin layer 704 deposited on the first thin layer 702 using ALD. In one embodiment, the first thin layer 702 is formed from tin oxide and the second thin layer 704 is formed from chromium oxide. A stacked or nanolaminated sensor structure 712 of Tin Oxide/Chromium Oxide. Since zinc oxide grows as rough film due to non-uniform nucleation, by combining tin oxide with the chromium oxide using ALD grows a smooth layered or nanolaminated film. Furthermore, the sensor structure 712 with stacked or alternating layers provides a high dielectric constant and also minimize leakage current. As illustrated in FIG. 17B, a nanolaminated sensor structure 812 includes alternating layers of Tin Oxide/Chromium Oxide wherein the layer 702 is formed from tin oxide and the layer 704 is formed from chromium oxide. The layers 702, 704 shown in FIGS. 17A and 17B each have approximately the same thickness. In some embodiments, however, the layers 702, 704 have different thickness.

In other embodiments, the nanolaminated sensor structure may include any desired number of layers 702, 704 that is configured to sense a desired target gas such as Ethanol, liquid petroleum gas (LPG), and the like. In another embodiment, the first thin layer 702 is formed from copper oxide and the second thin layer 704 is formed from zinc oxide. A stacked or nanolaminated sensor structure 712 of copper oxide-zinc oxide. Since zinc oxide grows as rough film due to non-uniform nucleation, by combining copper oxide with the zinc oxide using ALD grows a smooth layered or nanolaminated film. Furthermore, the sensor structure 712 with stacked or alternating layers provides a high dielectric constant and also minimize leakage current. In other embodiments, the nanolaminated sensor structure may include any desired number of layers 702, 704 that is configured to sense a desired target gas such as ammonia.

Figure 18:
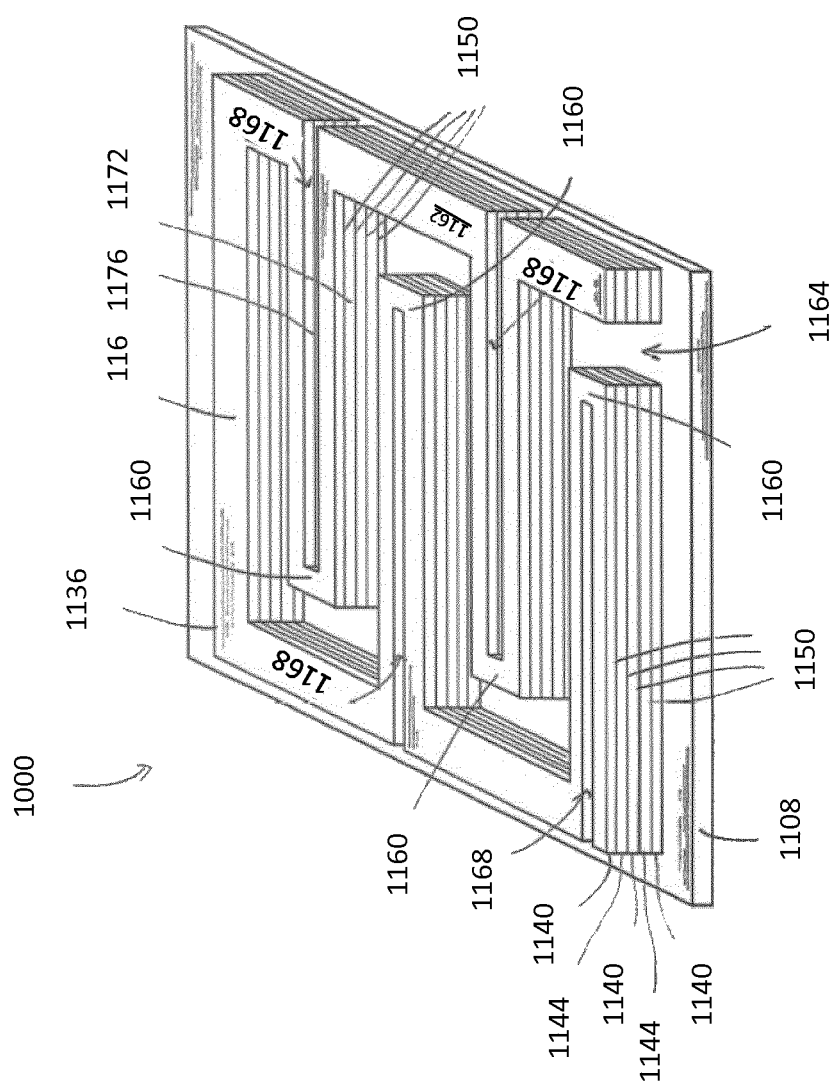
FIG. 18 is a perspective view of another embodiment of a nanolaminate thin film gas sensor device according to the disclosure.
Figure 19:
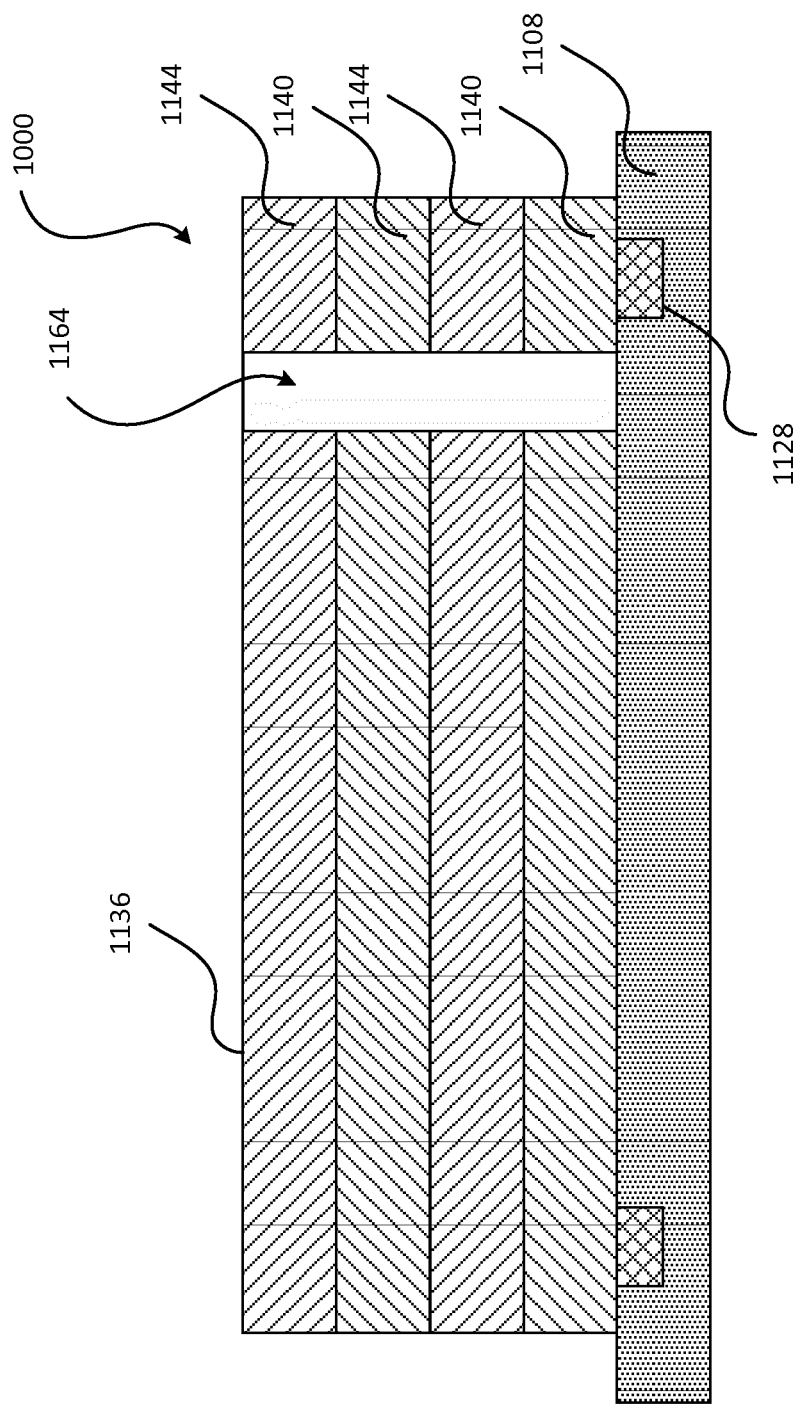
FIG. 19 is a cross section of the sensor device that is associated with a non-optical electrical resistance based read out circuit.

An alternate semiconductor sensor assembly, which in this embodiment is a thin film gas sensor device 1000, is shown in FIGS. 18 and 19. The exemplary embodiment of the sensor device 1000 includes a substrate 1108, two electrodes 1128, and a thin-film gas-sensitive structure 1136. Now returning to FIG. 17B, a nanolaminated sensor structure 812 includes alternating layers of copper oxide-zinc oxide wherein the layer 702 is formed from copper oxide and the layer 704 is formed from zinc oxide. The layers 702, 704 shown in FIGS. 17A and 17B each have approximately the same thickness. In some embodiments, however, the layers 702, 704 have different thickness.

The substrate 1108 is formed from aluminum oxide or another desired type of electrically insulated substrate. The electrodes 1128 are supported by and/or located in the substrate 1108 and are formed from an electrically conductive material, such as platinum or any other desired type of electrically conductive material. Electrical traces may be electrically connected to the electrodes 1128 in order to electrically connect the sensor device 1000 to an external read-out circuit The gas-sensitive structure 1136 is supported by the substrate 108 in electrical communication with the electrodes 1128. In an exemplary embodiment, the structure 1136 includes a plurality of interleaved layers 1140, 1144 of at least two mutually catalytic materials, which are configured to detect a target gas at exposed interfaces 1150 thereof. In an exemplary embodiment, the mutually catalytic materials include layer 1140 of chromium oxide and layers 1144 of tin oxide, which together are configured to detect for example ethanol and LPG. As illustrated in FIG. 19, five layers of material including three chromium layers 1140 and two tin oxide layers 1144. Each junction of the layers 1140, 1144 is referred to herein as a mutually catalytic bi-layer or simply as a bi-layer. In other embodiments, the structure 1136 includes any desired number of layers 1140, 1144, such as from two to fifty layers. Furthermore, in other embodiments, the layers 1140, 1144 are formed from any desired material or materials that are configured to sense a desired target gas. In another exemplary embodiment, the mutually catalytic materials include layer 1140 of copper oxide and layers 1144 of zinc oxide, which together are configured to detect for example ammonia. As illustrated in FIG. 19, five layers of material including three zinc oxide layers 1140 and two copper oxide layers 1144. Each junction of the layers 1140, 1144 is referred to herein as a mutually catalytic bi-layer or simply as a bi-layer. In other embodiments, the structure 1136 includes any desired number of layers 1140, 1144, such as from two to fifty layers. Furthermore, in other embodiments, the layers 1140, 1144 are formed from any desired material or materials that are configured to sense a desired target gas.

In other embodiment, additional layers of other materials may be included in the structure 1136 that are not sensitive to the target gas and are not mutually catalytic with the layers 1140, 1144. For example, in some embodiments a layer or layers of a structural material may be included to increase the strength of the structure 1136. Additionally, the structure 1136 may include a porous layer or layers to enable the target gas to flow through a portion of the structure 1136. Furthermore, the structure 1136 may include a heater layer that is configured to heat the layers 1140, 1144 in order to prepare the sensor device 1000 for sensing the target gas. In embodiments of the sensor device 1000 without a heater layer, at least one of the layers 140, 144 may function as a heater, because the layers 1140, 1144 are electrically conductive.

The layers 1140, 1144 each have approximately the same thickness. In some embodiments, however, the layers 1140,

1144 have different thickness. For example, in order to obtain a mutually catalytic effect from exemplary materials A and B it may be sufficient for the layers of material A to be five percent of the thickness of material B. In another embodiment, the mutually catalytic effect from materials A and B may be obtained when the layers of material A are five percent to eighty percent of the thickness of material B.

The structure 1136 further includes a plurality of digits 1160 that are interleaved with each other to define an interdigitated arrangement. In the illustrated embodiment, the structure 1136 defines five of the digits 1160. Some of the digits 1160 define a substantially "U" shape such that the electrical current flowing between the electrodes 1128 is routed substantially completely through the digit. Other embodiments may define from two to fifty of the digits 1160 based on at least the desired sensitivity of the structure 1136 to the target gas, the concentration of the target gas, and the chemical structure of the target gas.

To define the digits 1160, the structure 1136 includes a serpentine shaped trench 1164 and numerous digit trenches 1168 that each extend completely through the structure 1136. In other embodiments, the structure 1136 is patterned with a trench or trenches of any desired shape, so long as the structure 1136 is a unitary element through which electrical current is configured to flow between the electrodes 1128. In another embodiment, the structure 1136 is patterned with multiple trenches that are spaced apart from each other and configure the structure 1136 as a unitary element.

The interdigitated structure 1136 is optimized for sensing the target gas. In particular, the digits 1160 optimize the structure 1136 by at least partially defining the area of the exposed interfaces 1150 that is available for exposure to the target gas. Both an exterior surface 1172 of the digits 1160 and an interior surface 1176 of the digits defining a digit trench 1168 contributes to the area of the exposed interfaces 1150. The trenched structure 1136 of FIG. 18 includes exposed interfaces 1150 at the periphery as well as at the exterior exposed sides of digits 1160 and the interior exposed sides of the digits defining a digit trench 1168. Thus, the interdigitated structure 1136 has much more total area of exposed interfaces 1150 than a corresponding "non-trenched" structure. The sensitivity of the sensor device 1000 to the target gas is "tunable" based on at least the number of digits 1160, the area of the trenches 1164, 1168, the area of the exposed interfaces 1150, and the total number of the layers 1140, 1144.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. An environmental sensor system comprising:
    a structural base assembly having a top surface and a bottom surface;
    a first sensor portion coupled to the top surface of the structural base assembly; and
    a second sensor portion coupled to the bottom surface of the structure base assembly,
    wherein the structural base assembly comprises:
        a common substrate having the top surface and the bottom surface;
        a first set of sensing and heating pillars is disposed on the top surface; and
        a second set of sensing and heating pillars is disposed on the bottom surface;
    wherein the first sensor portion is coupled to the first set of sensing and heating pillars and the second sensor portion is coupled to the second set of sensing and heating pillars.

2. The environmental sensor system of claim 1 wherein one of the first sensor portion and the second sensor portion having a sensor layer formed from copper oxide using atomic layer deposition.

3. The environmental sensor system of claim 1 wherein a surface of the first sensor portion is formed from at least one of nickel oxide, copper oxide, zine oxide, tin oxide, or chromium oxide using atomic layer deposition.

4. The environmental sensor system of claim 1 wherein the first sensor portion comprises:
    an insulator layer;
    a seed layer; and
    a sensor layer;
    wherein a top surface of the sensor layer is formed from at least one of nickel oxide, copper oxide, zine oxide, tin oxide, or chromium oxide using atomic layer deposition.

5. The environmental sensor system of claim 4 wherein the first sensor portion is selected from a group comprising of a humidity sensor, carbon monoxide sensor, a gas sensor, a nitrogen oxide sensor, a hydrogen sulfide sensor, an ammonia sensor, an Ethanol sensor, or LPG sensor.

* * * * *